(12) United States Patent
Kamiya et al.

(10) Patent No.: US 10,156,909 B2
(45) Date of Patent: Dec. 18, 2018

(54) GESTURE RECOGNITION DEVICE, GESTURE RECOGNITION METHOD, AND INFORMATION PROCESSING DEVICE

(71) Applicant: MITSUBISHI ELECTRIC CORPORATION, Tokyo (JP)

(72) Inventors: Masashi Kamiya, Tokyo (JP); Yudai Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/560,716

(22) PCT Filed: Apr. 15, 2016

(86) PCT No.: PCT/JP2016/062052
§ 371 (c)(1),
(2) Date: Sep. 22, 2017

(87) PCT Pub. No.: WO2016/167331
PCT Pub. Date: Oct. 20, 2016

(65) Prior Publication Data
US 2018/0052521 A1 Feb. 22, 2018

(30) Foreign Application Priority Data
Apr. 17, 2015 (JP) ................. 2015-084853

(51) Int. Cl.
*G06F 3/01* (2006.01)
*G06T 7/20* (2017.01)
(Continued)

(52) U.S. Cl.
CPC .............. *G06F 3/017* (2013.01); *G06F 3/011* (2013.01); *G06F 3/0304* (2013.01);
(Continued)

(58) Field of Classification Search
CPC ........ G06F 3/017; G06F 3/0304; G06F 3/011; G06K 9/00335; G06K 9/00362; G06T 7/20
See application file for complete search history.

(56) References Cited

U.S. PATENT DOCUMENTS

2006/0168523 A1  7/2006  Yoda et al.
2008/0170776 A1* 7/2008  Albertson ............... G06F 21/35
                                                     382/154
(Continued)

FOREIGN PATENT DOCUMENTS

JP          9-330400 A     12/1997
JP       2004-246856 A      9/2004
(Continued)

OTHER PUBLICATIONS

Mori et al., "Early Recognition and Prediction of Gestures for Embodied Proactive Human Interface", Journal of the Robotics Society of Japan, Nov. 15, 2006, vol. 24, No. 8, pp. 66-75, particularly, '4. Gesture Network to Dosa Primitive' to '4.3 Dosa Primitive o Tan'i to shita Soki Ninshiki', fig.6.
(Continued)

*Primary Examiner* — Muhammad N Edun
(74) *Attorney, Agent, or Firm* — Birch, Stewart, Kolasch & Birch, LLP

(57) ABSTRACT

Provided are a gesture recognition device, a gesture recognition method and an information processing device for making it possible to quickly recognize a gesture of a user. The gesture recognition device includes a motion information generator that generates body part motion information by performing detection and tracking of the body part, a prediction processor that makes a first comparison of comparing the generated body part motion information with previously stored pre-gesture motion model information and generates a prediction result regarding a pre-gesture motion (Continued)

on the basis of a result of the first comparison, and a recognition processor that makes a second comparison of comparing the generated body part motion information with previously stored gesture model information and generates a result of recognition of the gesture represented by a motion of the detected body part on the basis of the prediction result and a result of the second comparison.

9 Claims, 18 Drawing Sheets

(51) Int. Cl.
  *G06K 9/00* (2006.01)
  *G06F 3/03* (2006.01)
(52) U.S. Cl.
  CPC ..... *G06K 9/00335* (2013.01); *G06K 9/00362* (2013.01); *G06T 7/20* (2013.01)

(56) References Cited

U.S. PATENT DOCUMENTS

| 2011/0320949 A1 | 12/2011 | Ohki et al. |
| 2012/0026083 A1 | 2/2012 | Okada |
| 2012/0146903 A1 | 6/2012 | Arihara et al. |
| 2013/0063345 A1 | 3/2013 | Maeda |
| 2013/0271618 A1* | 10/2013 | Koryakovskiy ... H04N 5/23219 348/211.5 |

FOREIGN PATENT DOCUMENTS

| JP | 2010-9484 A | 1/2010 |
| JP | 2010-182014 A | 8/2010 |
| JP | 2012-8772 A | 1/2012 |
| JP | 2012-22458 A | 2/2012 |
| JP | 2012-79138 A | 4/2012 |
| JP | 2012-123608 A | 6/2012 |
| JP | 2012-123617 A | 6/2012 |
| JP | 2012-518236 A | 8/2012 |
| JP | WO2012/011263 A1 | 9/2013 |
| JP | 2014-153954 A | 8/2014 |
| WO | WO 2010/095204 A1 | 8/2010 |
| WO | WO 2010/096279 A2 | 8/2010 |

OTHER PUBLICATIONS

Uchida et al., "Early Recognition and Prediction of Gestures for Proactive Human-Machine Interface", IEICE Technical Report, Nov. 11, 2004, vol. 104, No. 449, pp. 7-12, particularly, '2.4.1 Ninshiki Task to Jikken Shiryo', fig. 2, 5.

* cited by examiner

GESTURE RECOGNITION DEVICE, GESTURE RECOGNITION METHOD, AND INFORMATION PROCESSING DEVICE

TECHNICAL FIELD

The present invention relates to a gesture recognition device and a gesture recognition method for quickly recognizing a gesture by a user, and to an information processing device including the gesture recognition device.

BACKGROUND ART

A gesture UI (User Interface) for operating equipment according to body motion and shape (gesture) of a user is employed for various types of equipment in recent years. The gesture UI is often employed for game entertainment equipment, and is recently employed for various types of equipment such as broadcast receivers, PCs (Personal Computers), car navigation systems and information communication terminals.

The gesture UI uses user's gestures for operating equipment. Gestures recognized by the gesture UI include, for example, motions and shapes of a part of the user's body (motions and shapes of a hand, motions and shapes of a finger, etc.) and motions and shapes of the user's entire body. The gesture UI acquires captured image data (image data) of the user through an image capturing device such as a camera, recognizes the user's gesture in multiple frames of frame images (captured image data), and transmits information corresponding to the recognized gesture to the equipment (control object) as a user operation input signal (control signal). In the equipment employing the gesture UI, the operation of the equipment is controlled according to the user's gesture and thus the user can feel excellent operability.

In the description of Patent Reference 1, the start of a motion of the user's hand in a certain direction at a certain speed or higher, continuation of the motion of the user's hand, and stoppage of the motion of the user's hand or switching of the motion of the user's hand to a motion in the opposite direction are detected, and thereafter a process for recognizing the gesture performed by the user (e.g., a motion called a "swipe" of swinging a hand in a certain direction) is started.

PRIOR ART REFERENCE

Patent Reference

Patent Reference 1: International Publication NO. WO 2010/095204

SUMMARY OF THE INVENTION

Problem to be Solved by the Invention

However, in the method described in the Patent Reference 1, the gesture recognition process is started after detecting the start of the gesture, the continuation of the gesture and the completion of the gesture, and the control object equipment executes a process based on the result of the gesture recognition process (e.g., switching of the displayed picture) after the completion of the recognition process. Since in the conventional technology, the gesture recognition process is started after the completion of the user's gesture as above, there is a problem in that the time from the start of the gesture to the start of the execution of the process in the control object equipment is long. In other words, there is a problem of slow response of the control object equipment to the input operation by the user's gesture.

It is therefore an object of the present invention, which has been made to resolve the above-described problem with the conventional technology, to provide a gesture recognition device and a gesture recognition method with which the user's gesture can be quickly recognized and an information processing device including the gesture recognition device.

Means for Solving the Problem

A gesture recognition device according to the present invention includes: a motion information generator that generates body part motion information from a motion of a body part obtained by performing detection and tracking of the body part of a user in each of multiple frames of captured image data acquired by capturing images of the user; a prediction processor that previously stores pre-gesture motion model information indicating a reference motion of the body part of the user regarding a pre-gesture motion performed immediately before a gesture, makes a first comparison of comparing the body part motion information generated by the motion information generator with the pre-gesture motion model information, and generates a prediction result regarding the pre-gesture motion represented by the motion of the body part detected by the motion information generator on a basis of a result of the first comparison; and a recognition processor that previously stores gesture model information indicating a reference motion of the body part of the user in the gesture, makes a second comparison of comparing the body part motion information generated by the motion information generator with the gesture model information, and generates a result of recognition of the gesture represented by the motion of the body part detected by the motion information generator on a basis of the prediction result and a result of the second comparison.

Further, a gesture recognition method according to the present invention is a gesture recognition method executed by a gesture recognition device previously storing pre-gesture motion model information indicating a reference motion of a body part of a user regarding a pre-gesture motion performed immediately before a gesture and gesture model information indicating a reference motion of the body part of the user in the gesture, the method including: a motion information generation step of generating body part motion information from a motion of the body part obtained by performing detection and tracking of the body part of the user in each of multiple frames of captured image data acquired by capturing images of the user; a prediction processing step of making a first comparison of comparing the body part motion information generated in the motion information generation step with the pre-gesture motion model information and generating a prediction result regarding the pre-gesture motion represented by the motion of the body part detected in the motion information generation step on a basis of a result of the first comparison; and a recognition processing step of making a second comparison of comparing the body part motion information generated in the motion information generation step with the gesture model information and generating a result of recognition of the gesture represented by the motion of the body part detected in the motion information generation step on a basis of the prediction result and a result of the second comparison.

Furthermore, an information processing device according to the present invention includes the above-described gesture recognition device, an image capturing device that transmits the captured image data to the gesture recognition device; and control object equipment that is controlled in accordance with the result of recognition of the gesture.

Effects of the Invention

In the present invention, the gesture performed subsequently to the pre-gesture motion is predicted from the pre-gesture motion performed immediately before the start of the gesture and the gesture recognition process is executed by using the result of the prediction. Therefore, it is possible in the present invention to start the gesture recognition process at a time point before the start of the gesture and to complete the gesture recognition process at a time point before the completion of the gesture. Thus, by the present invention, the time from the start of the gesture to the outputting of the control signal corresponding to the gesture can be shortened, and consequently, the time from the start of the gesture to the start of the operation of the control object equipment can be shortened.

MODE FOR CARRYING OUT THE INVENTION

Figure 1:
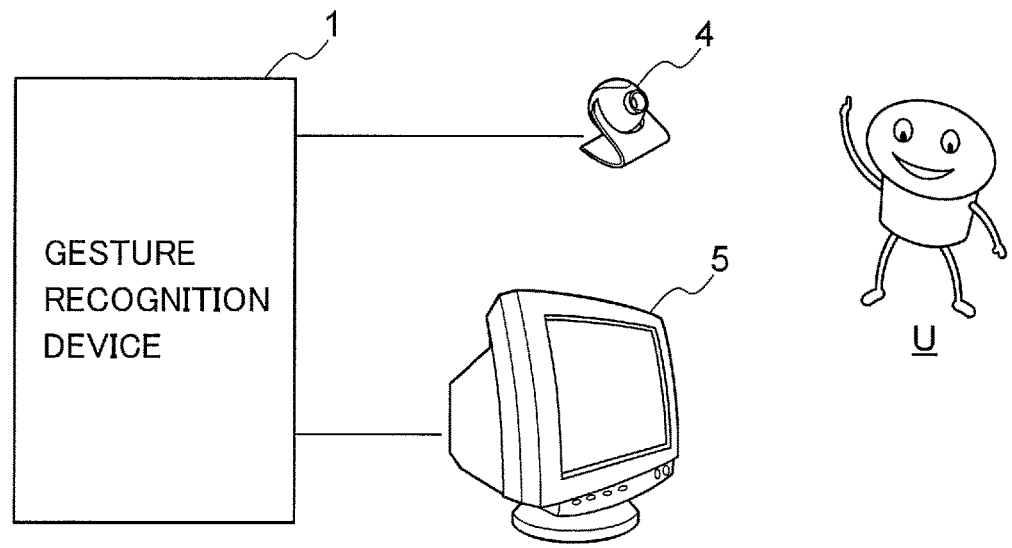
FIG. 1 is a schematic diagram showing an example of a configuration of an information processing device to which the present invention is applicable.

FIG. 1 is a diagram schematically showing an example of a configuration of an information processing device to which the present invention is applicable. The information processing device shown in FIG. 1 includes a gesture recognition device 1, a camera 4 as an image capturing device connected to the gesture recognition device 1, and a display 5 as an image display unit connected to the gesture recognition device 1. In FIG. 1, a gesture UI is formed by the gesture recognition device 1 and the camera 4. The gesture recognition device 1 recognizes a pre-gesture motion (gesture preliminary motion) PG and a gesture performed by a user U by using multiple frames of frame images (captured image data) generated by the camera 4 for capturing images of the user U, and the display 5 performs image display according to a result of the recognition. The information processing device of FIG. 1 can employ any one of gesture recognition devices according to first to third embodiments and modification examples described below as the gesture recognition device 1.

Figure 2:
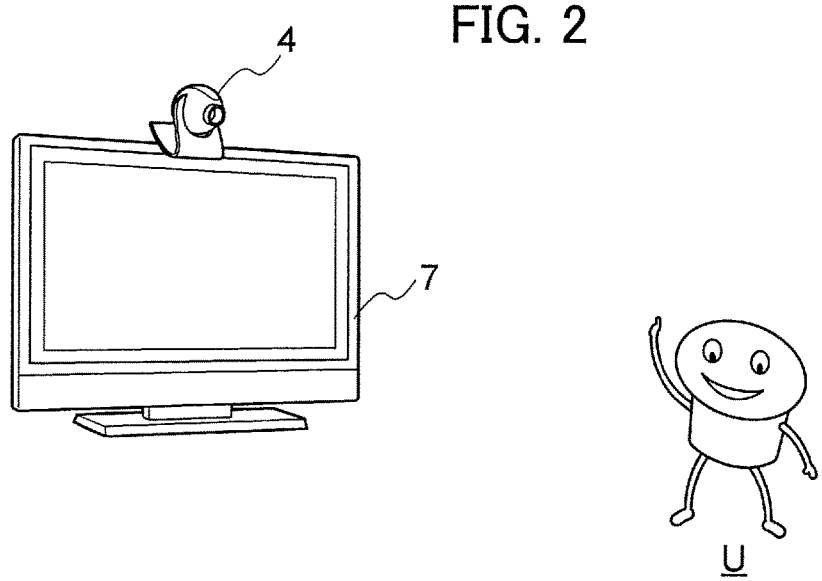
FIG. 2 is a schematic diagram showing another example of a configuration of an information processing device to which the present invention is applicable.

FIG. 2 is a diagram schematically showing another example of a configuration of an information processing device to which the present invention is applicable. The information processing device shown in FIG. 2 includes a gesture recognition device 7 having a display as the image display unit, and a camera 4 as an image capturing device connected to the gesture recognition device 7. In FIG. 2, the gesture UI is formed by the gesture recognition device 7 and the camera 4. The gesture recognition device 7 recognizes a pre-gesture motion PG and a gesture performed by the user U by using multiple frames of frame images (captured image data) generated by the camera 4 for capturing images of the user U, and the display performs image display according to a result of the recognition. The information processing device of FIG. 2 is the same as the information processing device of FIG. 1 except that the gesture recognition device 7 includes the display.

First Embodiment

Figure 3:
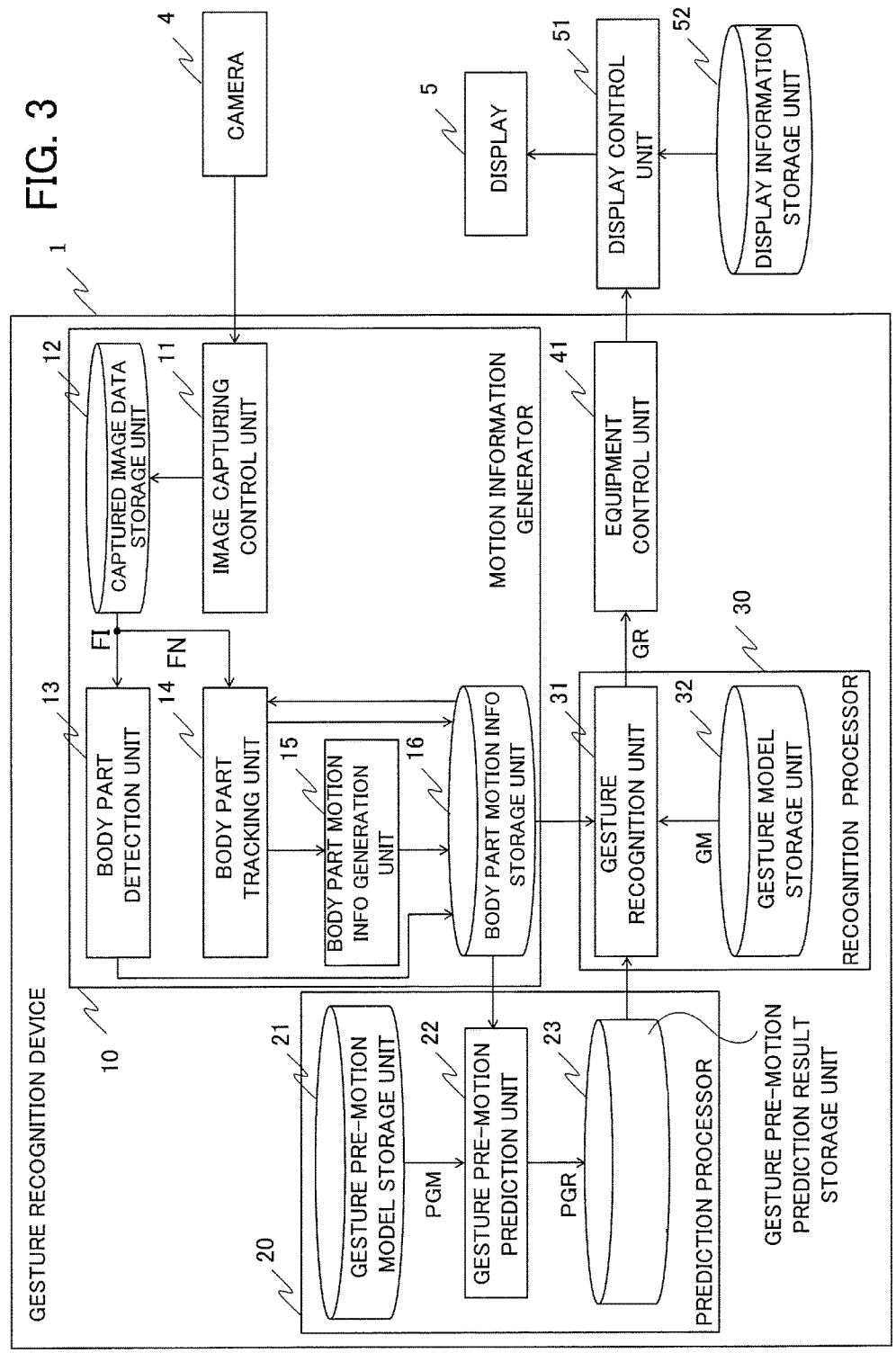
FIG. 3 is a block diagram schematically showing a configuration of a gesture recognition device according to a first embodiment of the present invention.

FIG. 3 is a block diagram schematically showing a configuration of a gesture recognition device 1 according to a first embodiment of the present invention. The gesture recognition device 1 is a device capable of executing a gesture recognition method according to the first embodiment. In the first embodiment, the camera 4 shown in FIG. 1 and a display control unit 51 are connected to the gesture recognition device 1, while a display information storage unit 52 and the display 5 as control object equipment are connected to the gesture recognition device 1 via the display control unit 51. The information processing device including the gesture recognition device 1 is shown in FIG. 3.

As shown in FIG. 3, the gesture recognition device 1 is a device for identifying (determining) a gesture performed by the user and outputting a signal (control signal) corresponding to the gesture. As shown in FIG. 3, the gesture recognition device 1 includes a motion information generator 10, a prediction processor 20 and a recognition processor 30. The gesture recognition device 1 further includes an equipment control unit 41 that transmits a signal based on the gesture performed by the user to the display control unit 51 of the display 5 as the control object equipment.

The motion information generator 10 generates body part motion information from a motion of the body part obtained by performing detection and tracking of the user's body part in each of multiple frames of frame image data (also referred to as "frame images" or "captured image data") acquired by capturing images of the user with the camera 4.

The prediction processor 20 previously stores pre-gesture motion model information PGM indicating the motion of the user's body part in the pre-gesture motion PG performed immediately before the gesture. The prediction processor 20 makes a first comparison of comparing the body part motion information generated by the motion information generator 10 with the pre-gesture motion model information PGM and identifies (determines) the pre-gesture motion PG represented by the body part motion detected by the motion information generator 10 on the basis of a result of the first comparison. The prediction processor 20 is capable of predicting the gesture, which is expected to be performed, before a starting time point of the gesture (the time t2 in FIG. 14 explained later) by identifying the pre-gesture motion PG performed immediately before the gesture. In cases where the pre-gesture motion PG is successfully identified by the prediction processor 20, the equipment control unit 41 can thereafter output a control signal corresponding to the gesture that is predicted to be performed.

The recognition processor 30 previously stores gesture model information GM indicating the motion of the user's body part in the gesture. The recognition processor 30 makes a second comparison of comparing the body part motion information generated by the motion information generator 10 with the gesture model information GM and identifies the gesture represented by the body part motion detected by the motion information generator 10 on the basis of a result of the second comparison. When a gesture is identified by the recognition processor 30, the equipment control unit 41 outputs a control signal corresponding to the identified gesture. In cases where the pre-gesture motion PG performed immediately before the gesture is successfully identified, the recognition processor 30 can start the process corresponding to the predicted gesture at an early time point (before the time t2 in FIG. 14 explained later) and complete the gesture recognition process at an early time point (the time t3 in FIG. 14 explained later).

In FIG. 3, the motion information generator 10 includes an image capturing control unit 11, a captured image data storage unit 12, a body part detection unit 13, a body part tracking unit 14, a body part motion information generation unit 15 and a body part motion information storage unit 16, for example. In FIG. 3, the prediction processor 20 includes a pre-gesture motion model storage unit (first storage unit) 21, a pre-gesture motion prediction unit 22 and a pre-gesture motion prediction result storage unit 23, for example. In FIG. 3, the recognition processor 30 includes a gesture recognition unit 31 and a gesture model storage unit (second storage unit) 32, for example. In the information processing device shown in FIG. 3, the camera 4, the display 5, the display control unit 51 and the display information storage unit 52 are connected to the gesture recognition device 1. The display 5, the display control unit 51 and the display information storage unit 52 constitute a display device. While one camera 4 is shown in the drawing, a plurality of cameras may be connected to the gesture recognition device 1.

In the first embodiment, in regard to one user U included in frame images FI as the captured image data acquired by the image capturing with the camera 4, the left hand is detected as the body part and the gesture performed by the user is identified (recognized) by the motion of the left hand. The detection of the left hand is, for example, detection of a particular part of the left hand, such as detection of a barycentric position of a palm region or detection of a fingertip position. In the first embodiment, a description will be given of a case where the gesture recognized by the gesture recognition device 1 is a gesture called a "right swipe" performed with the left hand. The "right swipe" is a motion in which the user swings a hand (or an arm) in a right direction. The "right direction" in this case means the direction to the "right" of the user U facing the camera 4. Thus, in cases where images of the user U performing the "right swipe", swinging the left hand in the right direction, are captured with the camera 4 and the multiple frames of frame images FI are viewed in chronological order, a person viewing the multiple frame images FI sees images on the display in which the user U's hand moves in the left direction of the person viewing the display.

The camera 4 starts video image capturing (or image capturing of a plurality of consecutive still images) when a control signal representing the start of the image capturing is received from the image capturing control unit 11, and ends the video image capturing (or image capturing of the plurality of consecutive still images) when a control signal representing the end of the image capturing is received from the image capturing control unit 11.

The image capturing control unit 11 transmits the control signal representing the start or the end of the image capturing to the camera 4 and receives the frame images FI as the captured image data acquired by the image capturing by the camera 4. The captured image data storage unit 12 receives the frame images FI as the captured image data from the image capturing control unit 11 and stores the frame images FI together with their frame numbers FN. The frame images FI and the frame numbers FN stored in the captured image data storage unit 12 are read out by the body part detection unit 13 and the body part tracking unit 14.

The body part detection unit 13 acquires a frame image FI as the captured image data and its frame number FN from the captured image data storage unit 12. The body part detection unit 13 transmits coordinates LHP of the user's left hand included in the acquired frame image FI and the frame number FN of the acquired frame image FI to the body part motion information storage unit 16.

The body part tracking unit 14 reads out a frame image FI and its frame number FN from the captured image data storage unit 12 to acquire them. The body part tracking unit 14 also acquires left hand coordinates LHP(−1) in a frame image FI(−1) of one frame before from the body part motion information storage unit 16. The body part tracking unit 14 transmits the left hand coordinates LHP(−1) in the frame image FI(−1) of one frame before and left hand coordinates LHP(0) in the current frame image FI(0) to the body part motion information generation unit 15. The body part tracking unit 14 also transmits a control signal for deleting the stored body part motion information 150 to the body part motion information storage unit 16.

The body part motion information generation unit 15 acquires the left hand coordinates LHP(−1) in the frame image FI(−1) of one frame before and the left hand coordinates LHP(0) in the current frame image FI(0) from the body part tracking unit 14 and transmits the body part motion information 150 to the body part motion information storage unit 16.

Figure 10:
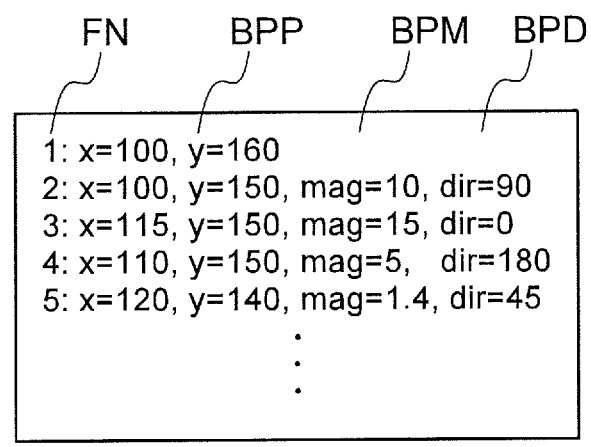
FIG. 10 is a diagram showing an example of body part motion information handled in the gesture recognition device according to the first embodiment.
Figure 11:
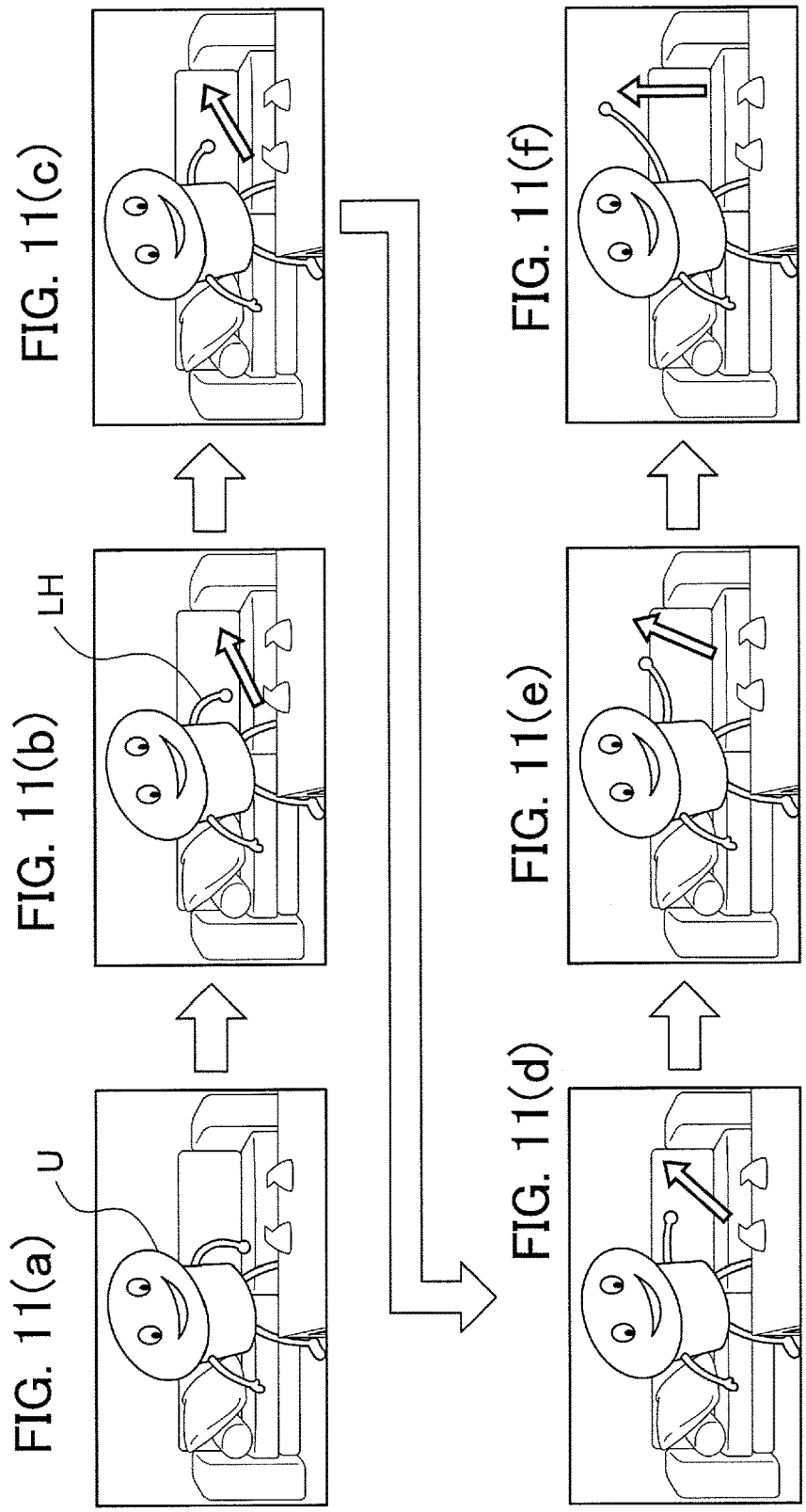
FIGS. 11(a) to 11(f) are diagrams showing an example of a pre-gesture motion detected by the gesture recognition device according to the first embodiment.

The body part motion information storage unit 16 receives the left hand coordinates LHP and the frame number FN from the body part detection unit 13 and stores them. Further, the body part motion information storage unit 16 receives the body part motion information 150 from the body part motion information generation unit 15 and stores the body part motion information 150. The left hand coordinates LHP(−1) in the frame image FI(−1) of one frame before stored in the body part motion information storage unit 16 are read out by the body part tracking unit 14. The body part motion information storage unit 16 receives the control signal for deleting the stored body part motion information 150 from the body part tracking unit 14 and deletes the information as the object of deletion at that time. The body part motion information 150 (which is shown in FIG. 10 explained later, for example) stored in the body part motion information storage unit 16 is read out by the pre-gesture motion prediction unit 22. The body part motion information 150 stored in the body part motion information storage unit 16 is read out also by the gesture recognition unit 31.

The pre-gesture motion model storage unit 21 stores the pre-gesture motion model information PGM. The pre-gesture motion model information PGM stored in the pre-gesture motion model storage unit 21 is read out by the pre-gesture motion prediction unit 22.

The pre-gesture motion prediction unit 22 acquires the body part motion information 150 from the body part motion information storage unit 16. The pre-gesture motion prediction unit 22 also acquires the pre-gesture motion model information PGM from the pre-gesture motion model storage unit 21. The pre-gesture motion prediction unit 22 transmits a pre-gesture motion prediction result PGR to the pre-gesture motion prediction result storage unit 23.

The pre-gesture motion prediction result storage unit 23 receives the pre-gesture motion prediction result PGR from the pre-gesture motion prediction unit 22 and stores it. The pre-gesture motion prediction result storage unit 23 transmits the pre-gesture motion prediction result PGR to the gesture recognition unit 31.

The gesture recognition unit 31 acquires the body part motion information 150 from the body part motion information storage unit 16. The gesture recognition unit 31 also acquires the pre-gesture motion prediction result PGR from the pre-gesture motion prediction result storage unit 23. The gesture recognition unit 31 also acquires the gesture model information GM from the gesture model storage unit 32. The gesture recognition unit 31 transmits a gesture identification result GR to the equipment control unit 41.

The gesture model storage unit 32 stores the gesture model information GM. The gesture model information GM stored in the gesture model storage unit 32 is read out by the gesture recognition unit 31.

The equipment control unit 41 receives the gesture identification result GR from the gesture recognition unit 31. The equipment control unit 41 transmits a control signal commanding the execution of an equipment operation corresponding to the gesture identification result GR to the display control unit 51.

The display control unit 51 receives the control signal commanding the execution of the equipment operation from the equipment control unit 41. Further, the display control unit 51 acquires display data for the image display on the display 5 from the display information storage unit 52 and makes the display 5 display images corresponding to the display data.

The display 5 receives the display data from the display control unit 51 and displays images based on the display data.

Figure 4:
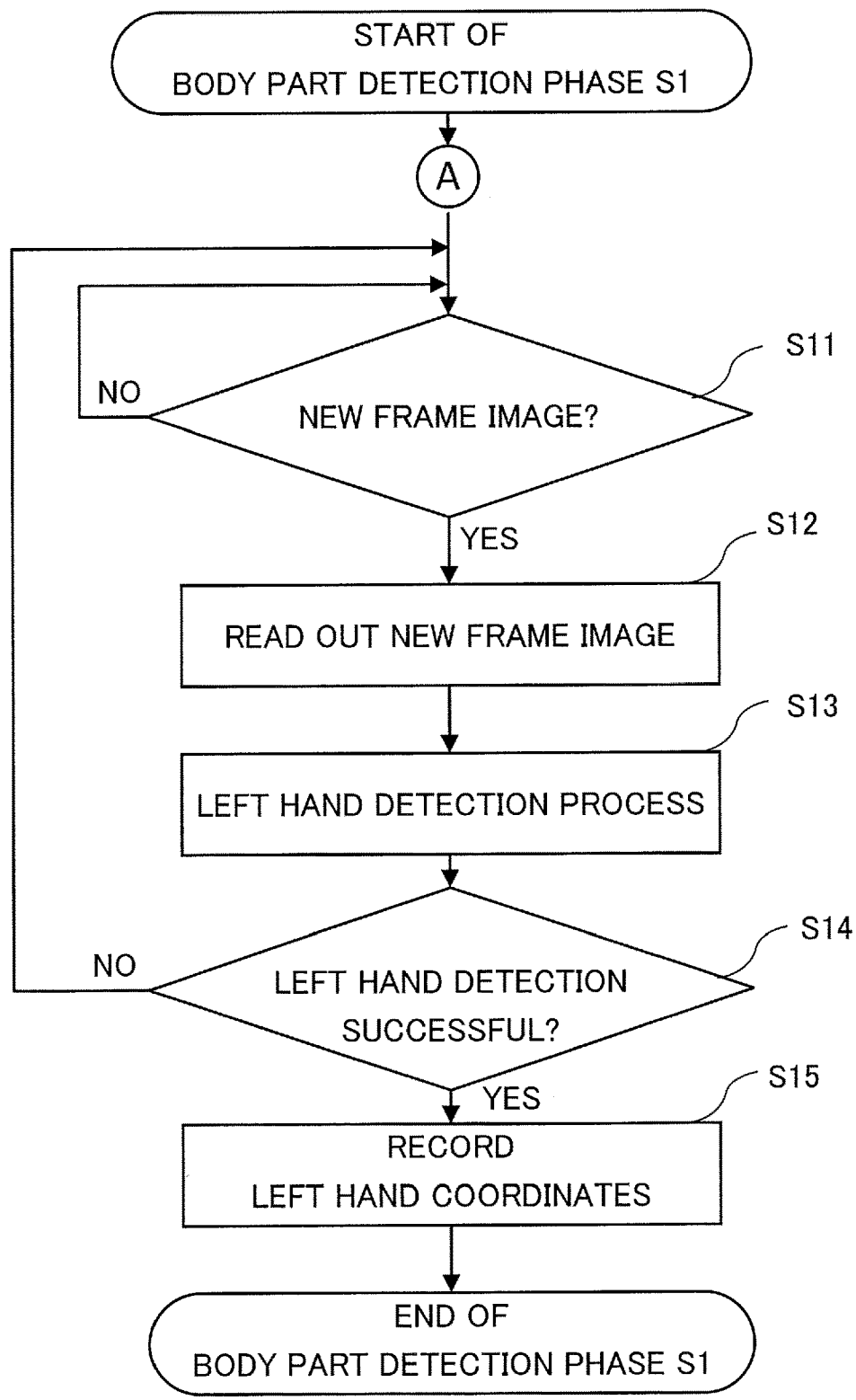
FIG. 4 is a flowchart showing a body part detection phase in the gesture recognition device according to the first embodiment.
Figure 5:
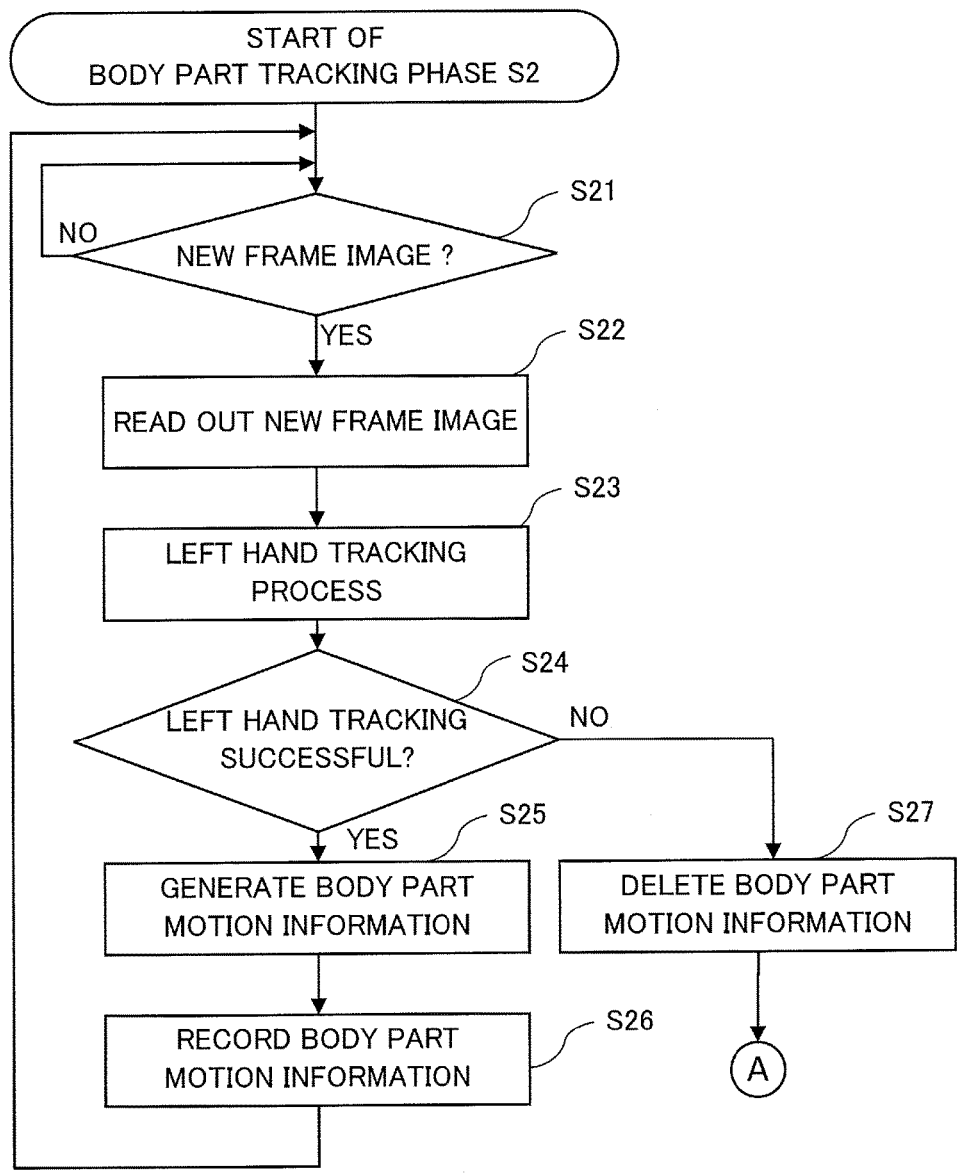
FIG. 5 is a flowchart showing a body part tracking phase in the gesture recognition device according to the first embodiment.
Figure 6:
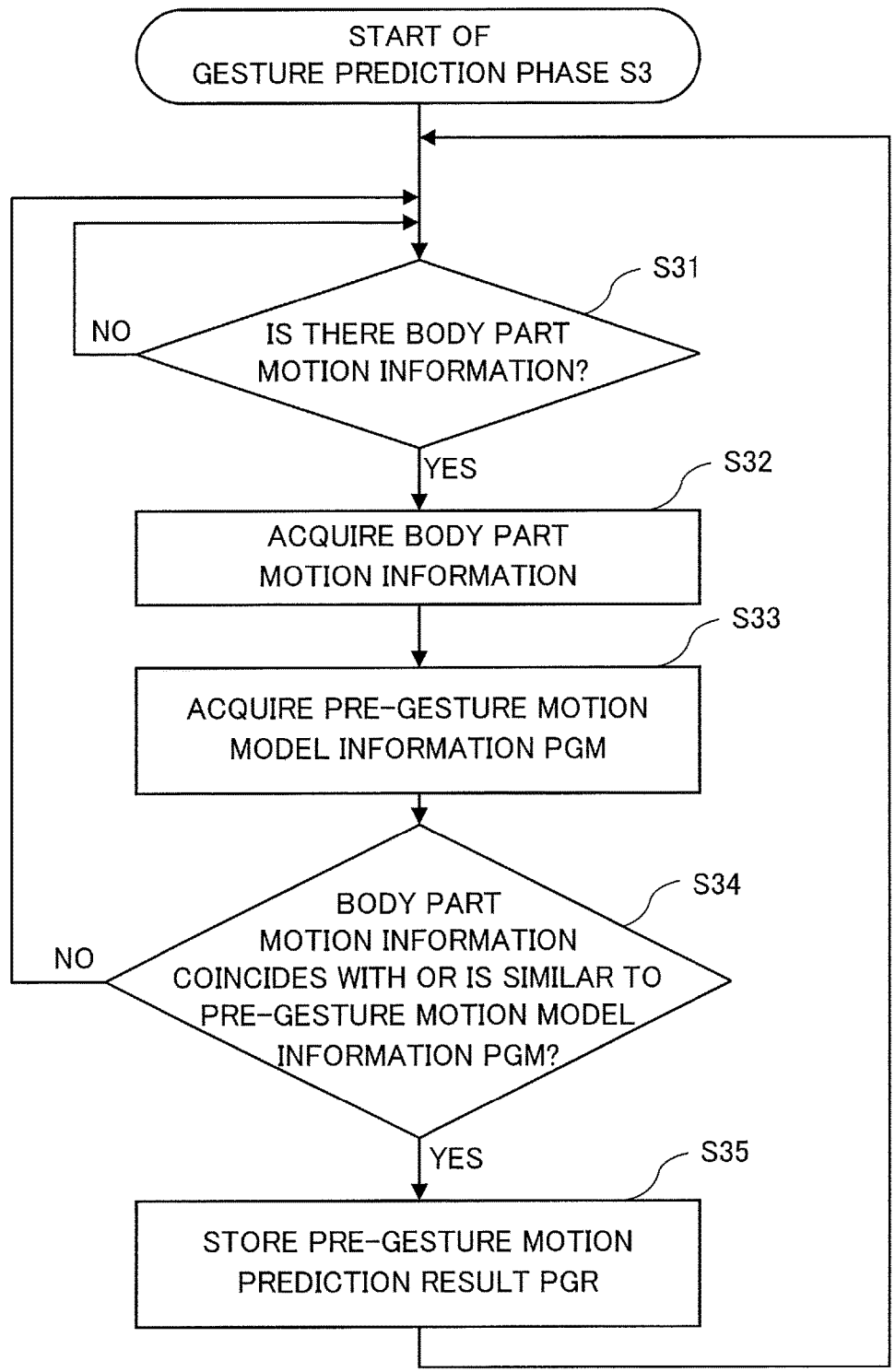
FIG. 6 is a flowchart showing a gesture prediction phase in the gesture recognition device according to the first embodiment.
Figure 7:
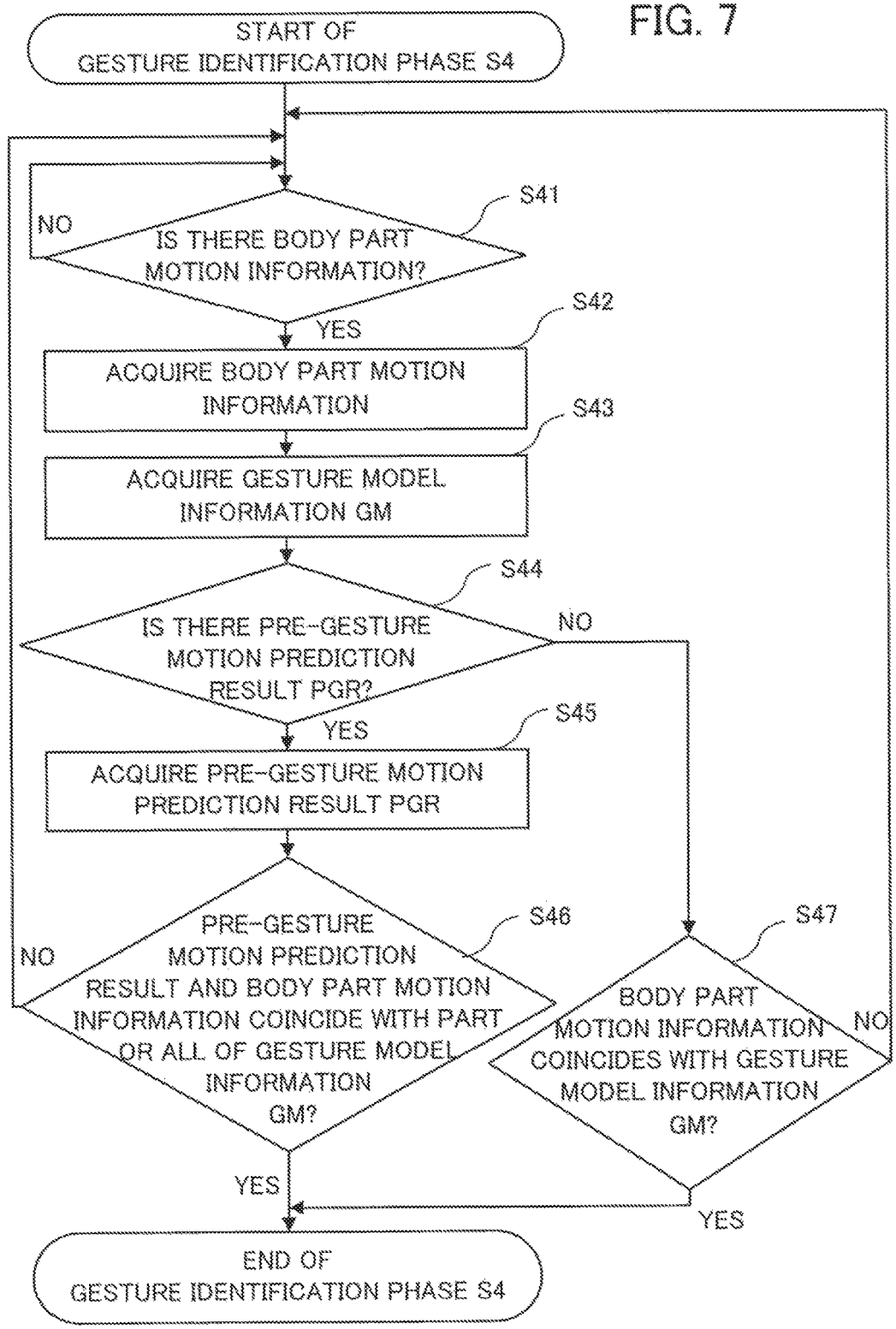
FIG. 7 is a flowchart showing a gesture identification phase in the gesture recognition device according to the first embodiment.

FIG. 4 is a flowchart showing a body part detection phase S1 of a gesture recognition process in the gesture recognition device 1 according to the first embodiment. FIG. 5 is a flowchart showing a body part tracking phase S2 of the gesture recognition process in the gesture recognition device 1 according to the first embodiment. FIG. 6 is a flowchart showing a gesture prediction phase S3 of the gesture recognition process in the gesture recognition device 1 according to the first embodiment. FIG. 7 is a flowchart showing a gesture identification phase S4 of the gesture recognition process in the gesture recognition device 1 according to the first embodiment.

The processing in the body part detection phase S1 will be explained with reference to FIG. 4. First, when a new frame image FI not undergone the body part detection process yet is accumulated in the captured image data storage unit 12 (YES in step S11 in FIG. 4), the body part detection unit 13 reads out the new frame image FI not undergone the body part detection process yet and its frame number FN from the captured image data storage unit 12 (step S12 in FIG. 4). When no new frame image FI not undergone the body part detection process yet is accumulated in the captured image data storage unit 12 (NO in step S11 in FIG. 4), the body part detection unit 13 performs no processing in the body part detection phase S1 and stays on standby until a new frame image FI not undergone the body part detection process yet is accumulated in the captured image data storage unit 12.

When accumulating the frame image FI as the captured image data, the captured image data storage unit 12 stores not only the pixel values of pixels constituting one frame of frame image but also the frame number FN assigned to each frame for identifying the frame. The frame number FN is assigned to each frame image FI captured by the camera 4. For example, the frame number FN of a frame image FI captured first is set as "FN=0", and thereafter the frame numbers FN of frame images FI captured in sequence are successively incremented by 1, like "FN=1", "FN=2", . . . .

When the body part detection unit 13 judges whether or not the newest frame image FI is accumulated in the captured image data storage unit 12, the body part detection unit 13 compares the frame number FN of a frame image FI that underwent the previous body part detection process with the frame number FN stored in the captured image data storage unit 12 and thereby checks whether or not the stored frame number FN has been incremented by one or more from the frame number FN of the frame image FI that underwent the previous body part detection process. When the frame number FN has been incremented by one or more, the body part detection unit 13 reads out a new frame image FI and its frame number FN from the captured image data storage unit 12 (step S12 in FIG. 4).

Figure 8:
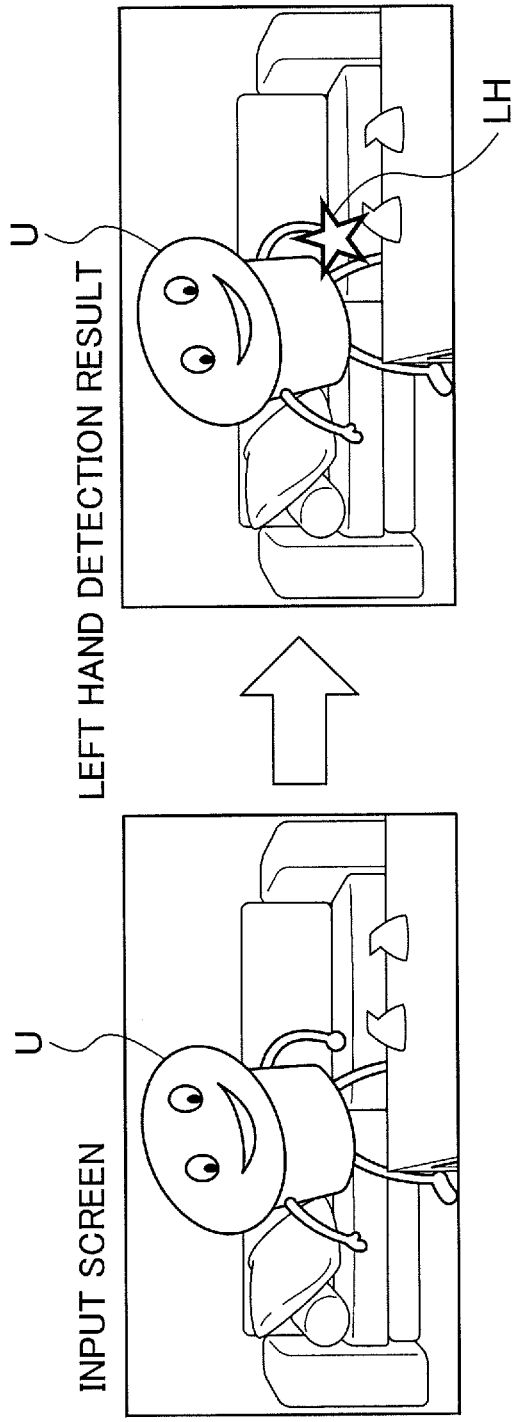
FIGS. 8(a) and 8(b) are diagrams showing an example of a body part detection process (body part detection phase) in the gesture recognition device according to the first embodiment.

FIGS. 8(*a*) and 8(*b*) are diagrams showing an example of the body part detection process (body part detection phase S1) in the gesture recognition device 1 according to the first embodiment. FIG. 8(*a*) shows the captured image data (input image) inputted to the gesture recognition device 1, while FIG. 8(*b*) shows a result of detection of the left hand LH. In multiple frame images FI shown in FIG. 8(*a*) read out from the captured image data storage unit 12, the body part detection unit 13 detects the left hand LH as shown in FIG. 8(*b*) (step S13 in FIG. 4). Methods for detecting a particular body part such as a hand in captured image data as an object are publicly known and the body part detection unit 13 can freely select a body part detection method.

When the left hand coordinates LHP are detected successfully (YES in step 14 in FIG. 4), the body part detection unit 13 transmits the detected left hand coordinates LHP and the frame number FN to the body part motion information storage unit 16. The body part motion information storage unit 16 receives the left hand coordinates LHP and the frame number FN from the body part detection unit 13 and stores them (step S15 in FIG. 4). In contrast, when the left hand coordinates LHP cannot be detected (NO in step 14 in FIG. 4), the body part detection unit 13 stays on standby until a new frame image FI is accumulated again in the captured image data storage unit 12.

In the case where the left hand coordinates LHP are detected successfully, the body part tracking phase S2 shown in FIG. 5 is carried out when a new frame image FI is accumulated again in the captured image data storage unit 12. Specifically, not the body part detection unit 13 but the body part tracking unit 14 reads out the frame image FI and the frame number FN to perform the tracking process.

As shown in FIG. 5, when the captured image data storage unit 12 has accumulated a new frame image FI not undergone the body part tracking process (YES in step S21 in FIG. 5), the body part tracking unit 14 reads out the new frame image FI and its frame number FN from the captured image data storage unit 12 to acquire them (step S22 in FIG. 5). When the captured image data storage unit 12 has not accumulated a new frame image FI (NO in step S21 in FIG. 5), the body part tracking unit 14 stays on standby without performing the subsequent body part tracking process until a new frame image FI is accumulated.

Figure 9:
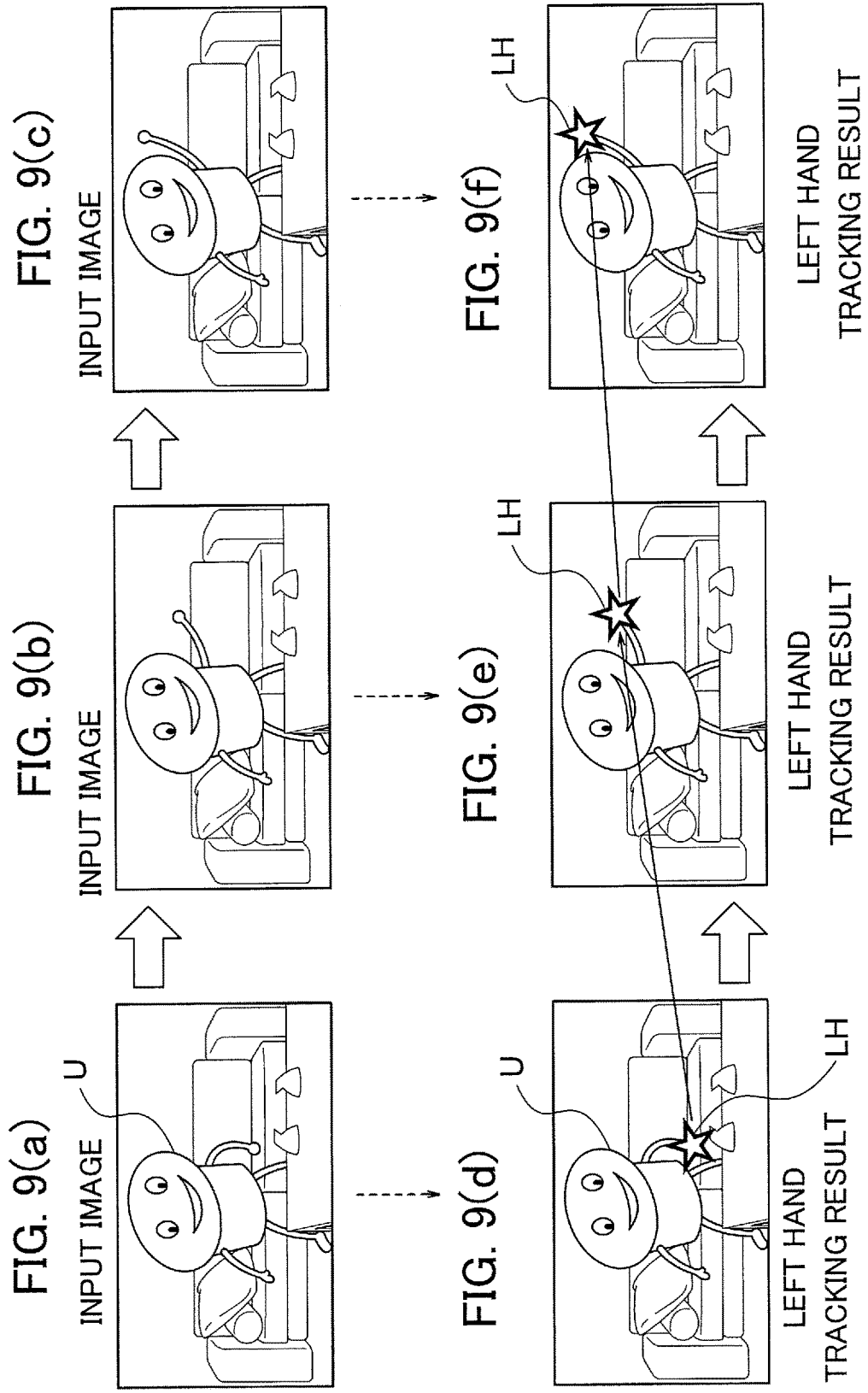
FIGS. 9(a) to 9(f) are diagrams showing an example of a body part tracking process (body part tracking phase) in the gesture recognition device according to the first embodiment.

FIGS. 9(*a*) to 9(*f*) are diagrams showing an example of the body part tracking process (body part tracking phase S2) in the gesture recognition device 1 according to the first embodiment. FIGS. 9(*a*) to 9(*c*) show frame images (input images) of frames based on the captured image data, while FIGS. 9(*d*) to 9(*f*) are diagrams respectively indicating the positions of the left hand LH in FIGS. 9(*a*) to 9(*c*) with star marks. In multiple frame images FI read out from the captured image data storage unit 12 as shown in FIGS. 9(*a*) to 9(*c*), the body part tracking unit 14 performs the tracking of the left hand LH as shown in FIGS. 9(*d*) to 9(*f*) (step S23 in FIG. 5). Specifically, the body part tracking unit 14 acquires the left hand coordinates LHP(−1) in the frame image FI(−1) of one frame before from the body part motion information storage unit 16 and detects the left hand LH in the newest frame image FI(0) at coordinates in the vicinity of the left hand coordinates LHP(−1). In such cases where the left hand LH detected in the newest frame image FI(0) exists in the vicinity of the left hand coordinates LHP(−1) in the frame image FI(−1) of one frame before, a method performing the tracking by regarding the left hand LH as the identical body part can be employed. The method tracking the left hand LH as the identical body part is a publicly known method, like the method performing the tracking by using feature values based on luminance distribution. The body part tracking unit 14 can freely select the body part tracking method from such publicly known methods.

When the tracking of the left hand is successful (YES in step S24 in FIG. 5), the body part tracking unit 14 transmits the left hand coordinates LHP(−1) in the frame image FI(−1) of one frame before and the left hand coordinates LHP(0) in the current frame image FI(0) to the body part motion information generation unit 15.

In contrast, when the tracking of the left hand fails (NO in step S24 in FIG. 5), the body part tracking unit 14 transmits a control signal, commanding deletion of the body part motion information 150 stored before the time point when the tracking was judged to have failed, to the body part motion information storage unit 16. The body part motion information storage unit 16 which has received the control signal deletes the stored body part motion information 150 according to the command of the received control signal (step S27 in FIG. 5). In the case where the tracking failed, the process of the body part detection phase S1 is performed on the next frame image FI (the process advances from A in FIG. 5 to A in FIG. 4).

In the case where the tracking by the body part tracking unit 14 is successful (YES in step S24 in FIG. 5), the body part motion information generation unit 15 acquires the left hand coordinates LHP(−1) in the frame image FI(−1) of one frame before and the left hand coordinates LHP(0) in the current frame image FI(0) from the body part tracking unit 14 and generates the body part motion information 150 like the information shown in FIG. 10 from these sets of left hand coordinates LHP (step S25 in FIG. 5).

FIG. 10 is a diagram showing an example of the body part motion information handled in the gesture recognition device 1 according to the first embodiment. As shown in FIG. 10, the body part motion information 150 includes the frame number FN, body part coordinates BPP (xy coordinate position), body part motion magnitude BPM (motion magnitude "mag"), and a body part motion direction BPD (an angle "dir" (unit: degrees) with respect to a reference direction). The body part motion information 150 is stored in the body part motion information storage unit 16.

The body part motion information generation unit 15 transmits the body part motion information 150 generated as above to the body part motion information storage unit 16. The body part motion information storage unit 16 stores the body part motion information 150 (step S26).

As shown in FIG. 6, in the gesture prediction phase S3, in cases where the body part motion information 150 is stored in the body part motion information storage unit 16 (YES in step S31 in FIG. 6), the pre-gesture motion prediction unit 22 reads out the body part motion information 150 from the body part motion information storage unit 16 (step S32 in FIG. 6). In cases where the body part motion information 150 is not stored in the body part motion information storage unit 16 (NO in step S31 in FIG. 6), the pre-gesture motion prediction unit 22 stays on standby until the body part motion information 150 is stored in the body part motion information storage unit 16.

The pre-gesture motion prediction unit 22 reads out the body part motion information 150 from the body part motion information storage unit 16, and reads out the pre-gesture motion model information PGM that is stored in advance from the pre-gesture motion model storage unit 21 (step S33 in FIG. 6).

FIGS. 11(a) to 11(f) are diagrams showing an example of the pre-gesture motion PG detected by the gesture recognition device 1 according to the first embodiment. When the user U performs the right swipe with the left hand LH as a gesture, the user U first performs a motion of moving the user U's left hand LH in the user's upper left direction (upper right direction in FIGS. 11(a) to 11(f)) (upward swing motion) in the order of FIGS. 11(a) to 11(f). As above, the user U tends to make the motion of swinging the hand upward in the order of FIGS. 11(a) to 11(f) immediately before performing the right swipe gesture with the left hand (before the time t2 in FIG. 14 explained later) and such a body part motion performed before the actual gesture is defined as the pre-gesture motion PG.

Figure 12:
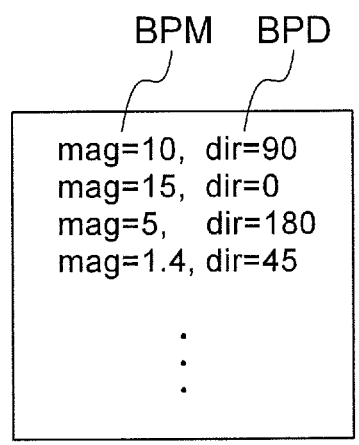
FIG. 12 is a diagram showing an example of pre-gesture motion model information previously stored in the gesture recognition device according to the first embodiment.
Figure 13:
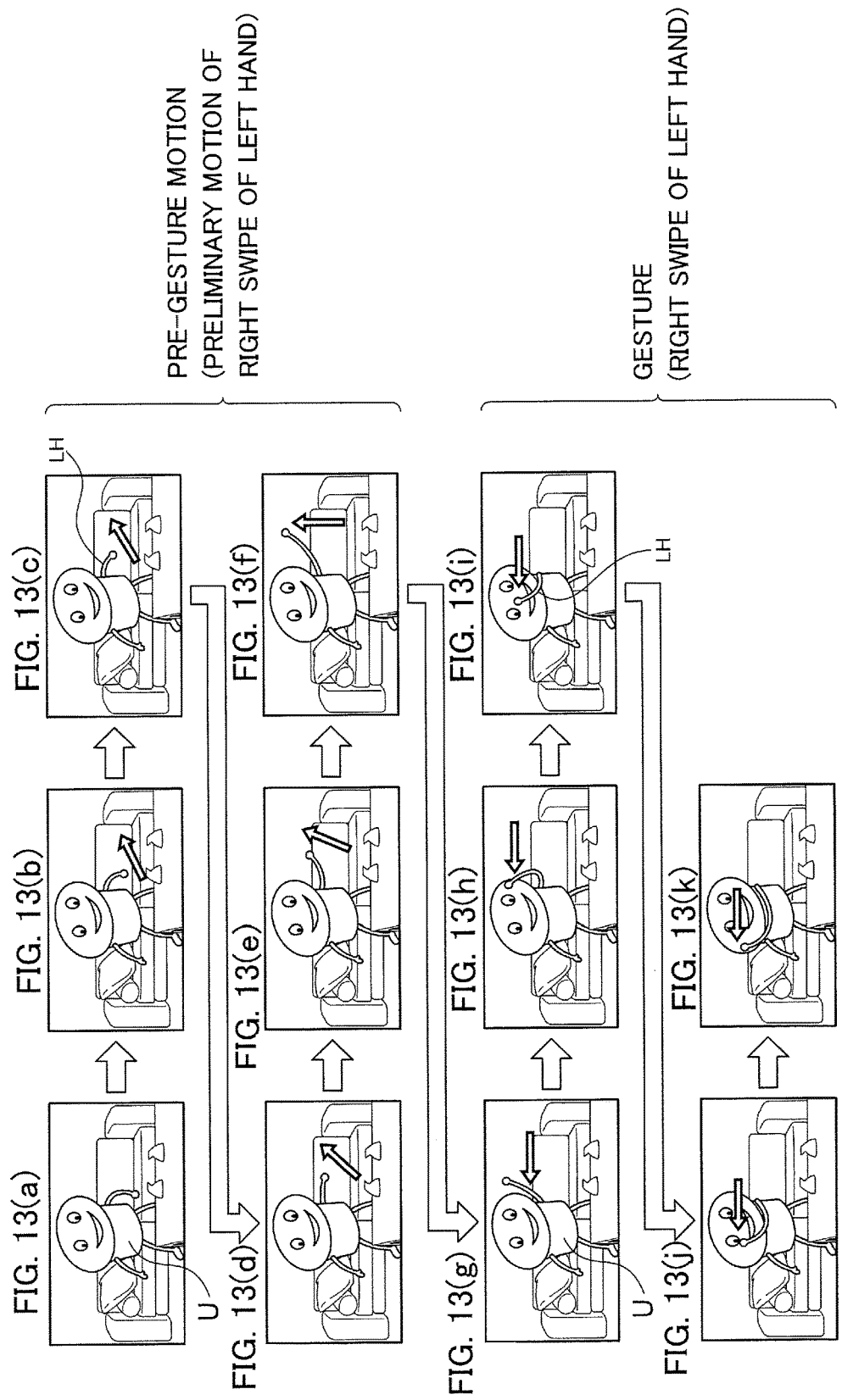
FIGS. 13(a) to 13(f) are diagrams showing an example of the pre-gesture motion detected by the gesture recognition device according to the first embodiment.
FIGS. 13(g) to 13(k) are diagrams showing an example of a gesture detected by the gesture recognition device according to the first embodiment.

FIG. 12 is a diagram showing an example of the pre-gesture motion model information PGM previously stored in the gesture recognition device 1 according to the first embodiment. The pre-gesture motion model information PGM is body part pre-motion information 151 describing the body part motion information regarding the pre-gesture motion PG. As shown in FIG. 12, the pre-gesture motion model information PGM includes the body part motion magnitude BPM and the body part motion direction BPD.

The body part motion magnitude BPM and the body part motion direction BPD in the pre-gesture motion model information PGM are described as averages of the motion magnitudes and the motion directions of the left hand coordinates LHP in the pre-swipe motions performed before the right swipe is performed, previously collected in regard to one or more people and one or more pre-swipe motions. Specifically, the body part motion magnitude BPM and the body part motion direction BPD are described in chronological order to indicate what type of motion is performed in average as a motion prior to the right swipe.

The pre-gesture motion prediction unit 22 calculates a degree of similarity (first degree of similarity) between the body part motion information 150 read out from the body part motion information storage unit 16 and the pre-gesture motion model information PGM read out from the pre-gesture motion model storage unit 21. The degree of similarity can be obtained by grasping the body part motion magnitude BPM and the body part motion direction BPD in each frame as a vector, determining the Euclidean distance and the correlation coefficient between the vectors of the body part motion information 150 and the pre-gesture motion model information PGM along a timeline, and calculating an average of the Euclidean distances and an average of the correlation coefficients, and these averages can be used as the degree of similarity.

The degree of similarity represents a higher degree of similarity as its value increases. Even when two motions are similar to each other, if the times necessary for the two motions differ from each other, the degree of similarity calculated based on the one-to-one correspondence along the temporal axis can be low. Such low degree of similarity occurs when the user U slowly performs the pre-gesture motion PG of swinging the left hand upward, for example. Therefore, in the calculation of the degree of similarity, the comparison may be made by sampling the body part motion magnitude BPM and the body part motion direction BPD in the pre-gesture motion model information PGM or the body part motion information 150 at different intervals.

Further, the pre-gesture motion prediction unit 22 judges whether or not the calculated degree of similarity is greater than or equal to a predetermined threshold value (first threshold value) MTH1. When the calculated degree of similarity is greater than or equal to the threshold value MTH1, the pre-gesture motion prediction unit 22 predicts that the user U is performing the pre-swipe motion as the pre-gesture motion PG performed before the right swipe is performed. When the calculated degree of similarity is less than the threshold value MTH1, the pre-gesture motion prediction unit 22 predicts that the user U is not performing the pre-swipe motion performed before the right swipe is performed. When predicting that the user U is performing the pre-swipe motion performed before the right swipe is performed, the pre-gesture motion prediction unit 22 transmits the pre-gesture motion prediction result PGR indicating the fact to the pre-gesture motion prediction result storage unit 23, and the pre-gesture motion prediction result storage unit 23 stores the pre-gesture motion prediction result PGR. The pre-gesture motion prediction result PGR can be information like a simple flag, for example, and it is possible to describe and store "1" when it is predicted that the user U is performing the pre-swipe motion performed before the right swipe is performed, for example.

As shown in FIG. 7, in the gesture identification phase S4, in cases where the body part motion information 150 is stored in the body part motion information storage unit 16 (YES in step S41 in FIG. 7), the gesture recognition unit 31 acquires the body part motion information 150 (step S42 in FIG. 7). In cases where the body part motion information 150 is not stored in the body part motion information storage unit 16 (NO in step S41 in FIG. 7), the gesture recognition unit 31 stays on standby until the body part motion information 150 is stored in the body part motion information storage unit 16.

The gesture recognition unit 31 reads out the body part motion information 150 from the body part motion information storage unit 16, and reads out the gesture model information GM from the gesture model storage unit 32 (step S43 in FIG. 7).

In cases where the pre-gesture motion prediction result PGR is stored in the pre-gesture motion prediction result storage unit 23 (YES in step S44 in FIG. 7), the gesture recognition unit 31 reads out the pre-gesture motion prediction result PGR (step S45 in FIG. 7). In cases where the pre-gesture motion prediction result PGR is not stored in the pre-gesture motion prediction result storage unit 23 (NO in step S44 in FIG. 7), the gesture recognition unit 31 judges whether or not the body part motion information coincides with the gesture model information as the gesture motion model (step S47 in FIG. 7).

In the case where the gesture recognition unit 31 reads out the pre-gesture motion prediction result PGR from the pre-gesture motion prediction result storage unit 23, the gesture recognition unit 31 calculates the degree of similarity between information regarding all of the frames in the body part motion information 150 which has been read out and information regarding all of the frames in the gesture model information GM, or calculates the degree of similarity between information regarding part of the frames in the body part motion information 150 and information regarding part of the frames in the gesture model information GM.

The gesture recognition unit 31 judges whether or not the calculated degree of similarity (a second degree of similarity) is higher than or equal to a threshold value (second threshold value) MTH2, and recognizes that the user U is in the middle of performing (or has performed) the right swipe if the degree of similarity is higher than or equal to the threshold value MTH2, or recognizes that the user U is not performing the right swipe if the degree of similarity is less than the threshold value MTH2. When the user U is recognized to be in the middle of performing (or to have performed) the right swipe, the gesture recognition unit 31 transmits the gesture identification result GR to the equipment control unit 41 (YES in step S46 in FIG. 7), and when the user U is recognized not to be performing the right swipe, the gesture recognition unit 31 performs no processing (NO in step S46 in FIG. 7).

As a result of actual verification conducted by using some test subjects as the users U, it has been confirmed that each test subject swings the left hand LH upward while moving the left hand LH in the upper left direction, as the pre-gesture motion PG in cases of performing the right swipe with the left hand LH, and then swipes the left hand LH in the right direction. Thus, if the upward swing motion is predicted by the pre-gesture motion prediction unit 22 and thereafter the gesture recognition unit 31 can recognize that the user U has started swiping the left hand LH in the right direction, the right swipe can be recognized even before the completion of the gesture (before the left hand LH reaches the final position in the right direction).

FIGS. 13(a) to 13(f) are diagrams showing an example of the pre-gesture motion PG detected by the gesture recognition device 1 according to the first embodiment, and FIGS. 13(g) to 13(k) are diagrams showing an example of the gesture detected by the gesture recognition device according to the first embodiment. In the entire flow from the upward swing motion shown in FIGS. 13(a) to 13(f) to the swipe motion shown in FIGS. 13(g) to 13(k), the gesture can be recognized if an approximately first half of the swipe motion is recognized successfully.

Figure 14:
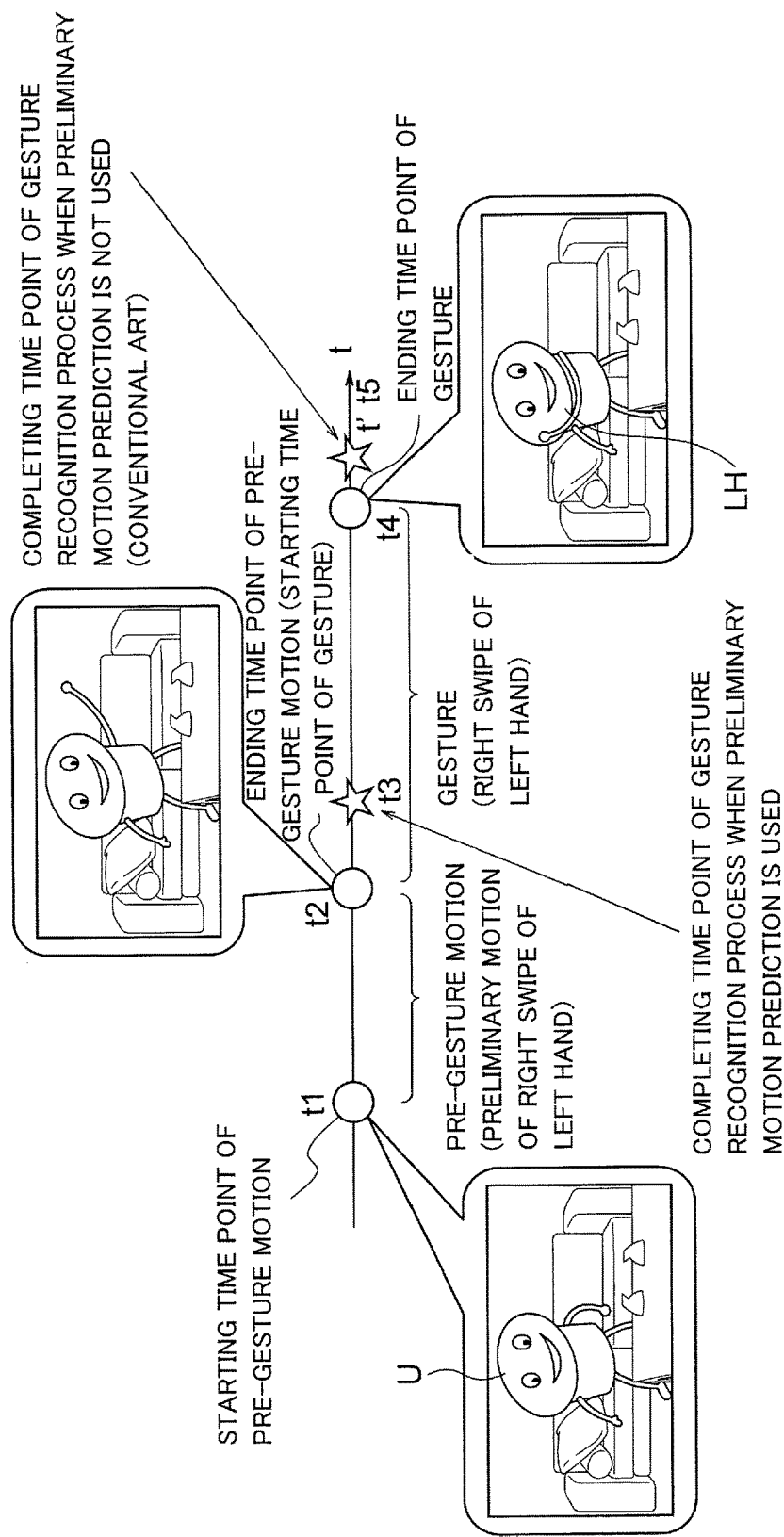
FIG. 14 is a diagram showing a starting time point of the pre-gesture motion, an ending time point of the pre-gesture motion (a starting time point of the gesture), a completing time point of the gesture, and a completing time point of a gesture recognition process in the gesture recognition device according to the first embodiment on a temporal axis.

FIG. 14 is a diagram showing a starting time point t1 of the pre-gesture motion PG, an ending time point t2 of the pre-gesture motion PG (starting time point of the gesture), a completing time point t4 of the gesture, and a completing time point t3 of the gesture recognition process in the gesture recognition device 1 according to the first embodiment. Even though there are the starting time point t1 of the pre-gesture motion PG, the ending time point t2 of the pre-gesture motion PG (gesture starting time point) and the completing time point t4 of the gesture, if the pre-gesture motion PG can be recognized as above, the gesture recognition unit 31 can transmit the gesture identification result GR to the equipment control unit 41 in a period between the ending time point t2 of the pre-gesture motion PG (gesture starting time point) and the gesture ending time point t4.

When the pre-gesture motion prediction result PGR is not acquired from the pre-gesture motion prediction result storage unit 23, the gesture recognition unit 31 calculates the degree of similarity between the body part motion information 150 regarding all or part of the frames and the gesture model information GM regarding all of the frames (second degree of similarity). The gesture model information GM describes the body part motion magnitude BPM and the body part motion direction BPD in the gesture.

As shown in FIG. 14, in cases where the pre-gesture motion PG cannot be recognized, the gesture is recognized based on the motion information on the left hand LH between the ending time point of the pre-gesture motion PG (gesture starting time point) and the gesture ending time point, and the gesture recognition unit 31 transmits the gesture identification result GR to the equipment control unit 41 after the gesture ending time point.

As explained above, when the pre-gesture motion PG is predicted successfully (the recognition process is completed at the time t3 in FIG. 14), the gesture recognition is possible in a shorter time compared to the case where the gesture recognition is performed based on the gesture alone without the prediction of the pre-gesture motion PG (the recognition process is completed at the time t5 in FIG. 14).

While it is also possible to perform the gesture recognition based on the pre-gesture motion prediction result PGR alone in the case where the pre-gesture motion PG is predicted successfully, it is desirable, for the purpose of improving the recognition success rate, to transmit the gesture identification result GR after a first part of the gesture is also recognized successfully.

Further, when the gesture model storage unit 32 stores the gesture model information GM regarding multiple types of gestures, the prediction of the pre-gesture motion PG makes it possible to narrow down the multiple types of gestures to a gesture which is highly likely made actually afterwards, and thus recognition time reduction effect and recognition success rate improvement effect can be obtained. The effects increase with the increase in the number of the types of gestures. When there are multiple gestures as the objects of recognition, it is generally necessary to successively compare the body part motion information 150 with the gesture model information GM regarding each of all the gestures; however, the comparison with all the gestures is unnecessary when there is the pre-gesture motion prediction result PGR. Even in cases where the comparison is made with all the gestures, the comparison can be made from a gesture having a high possibility on the basis of the pre-gesture motion prediction result PGR, which is advantageous since the expected value of the recognition time decreases in comparison with the conventional method.

The equipment control unit 41 receives the gesture identification result GR from the gesture recognition unit 31 and transmits a control signal to the display control unit 51 so that the information processing device 100 performs an equipment operation corresponding to the result. The equipment control unit 41 changes the image displayed on the display 5 upon each recognition of the right swipe, for example. The image after the change is, for example, an image stored in the display information storage unit 52 as the next image in a folder storing the image currently displayed on the display 5 (the order of images is determined according to the file name or the creation date/time, for example).

To perform such an equipment operation, the display control unit 51 which has received the control signal from the equipment control unit 41 reads out information to be displayed from the display information storage unit 52 and transmits the information to the display 5 to have the image displayed.

In the gesture recognition device 1 configured as above, the recognition of the gesture performed by the user U can be completed before the time point (the time t4 in FIG. 14) when the gesture is completed (e.g., at the time t3 in FIG. 14), and thus the equipment control based on the gesture recognition result can be executed earlier than the time in the conventional technology (e.g., the time t5 in FIG. 14). Accordingly, a time lag from the gesture execution to the equipment control felt by the user U can be shortened and gesture operation stressless for the user U becomes possible.

While the captured image data serving as a basis of the gesture recognition is assumed to be image data in the first embodiment, the captured image data is not limited to data acquired by a camera capable of capturing images by use of visible light (as color signals) and may be any of data acquired by image capturing by a camera capturing images by use of infrared light and data acquired by image capturing by two or more cameras. In cases where a camera capable of distance measurement is used, the body part detection by the body part detection unit 13 is facilitated. This is because the discrimination between a person included in the image data and other objects (background) is facilitated by distance information, for example.

While a case of using the right swipe of the left hand as a gesture which can be recognized by the gesture recognition device 1 has been described in the first embodiment, the present invention is applicable also to cases where other gestures are recognized, such as the left swipe of the left hand, the left swipe of the right hand, the left swipe of the right hand, the upward swipe of the left hand, the upward swipe of the right hand, the downward swipe of the left hand, and the downward swipe of the right hand.

Figure 15:
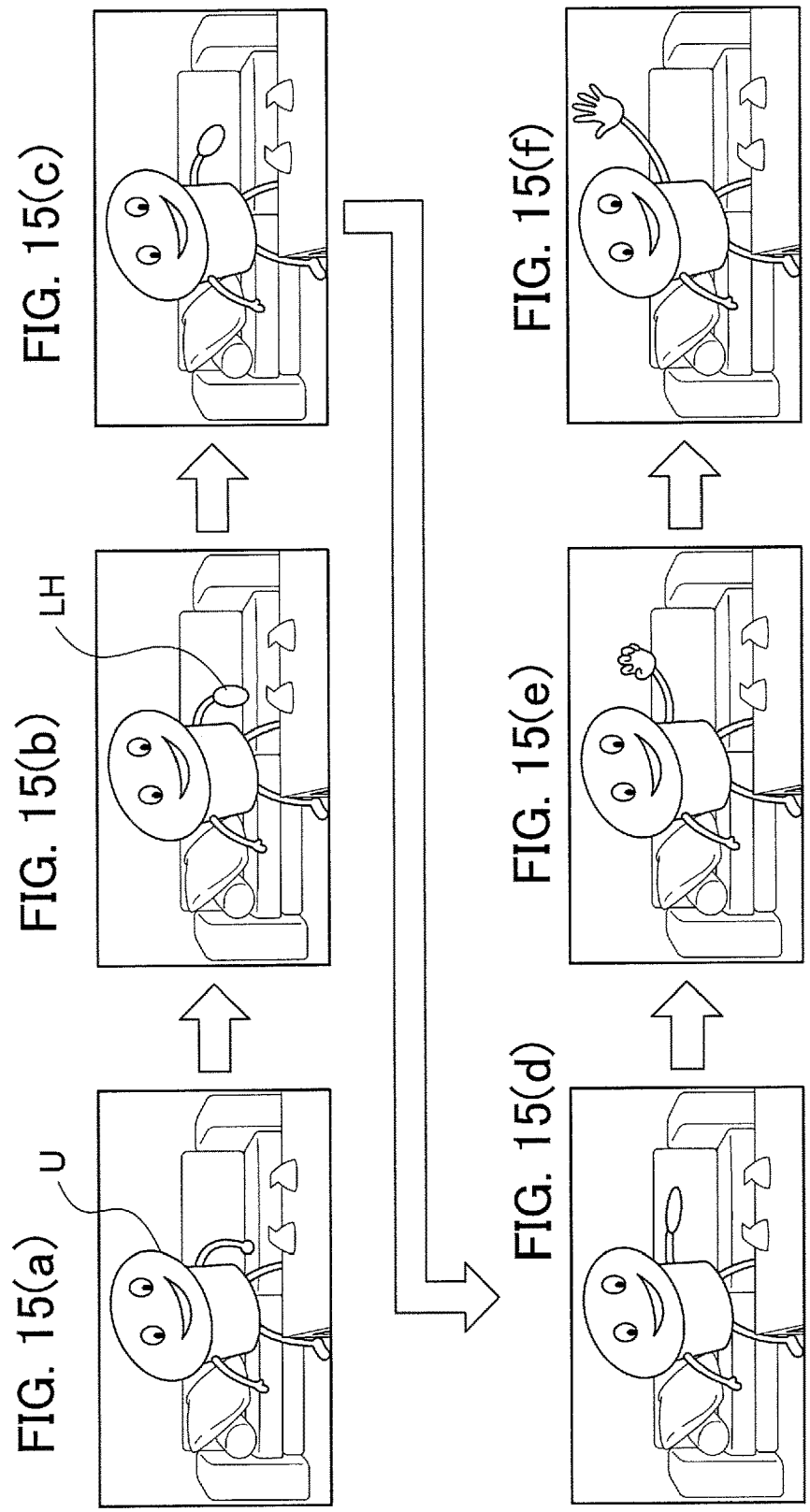
FIGS. 15(a) to 15(f) are diagrams showing another example of the pre-gesture motion (which forms the left hand in a shape with a palm open) immediately before the gesture detected by the gesture recognition device according to the first embodiment.
Figure 16:
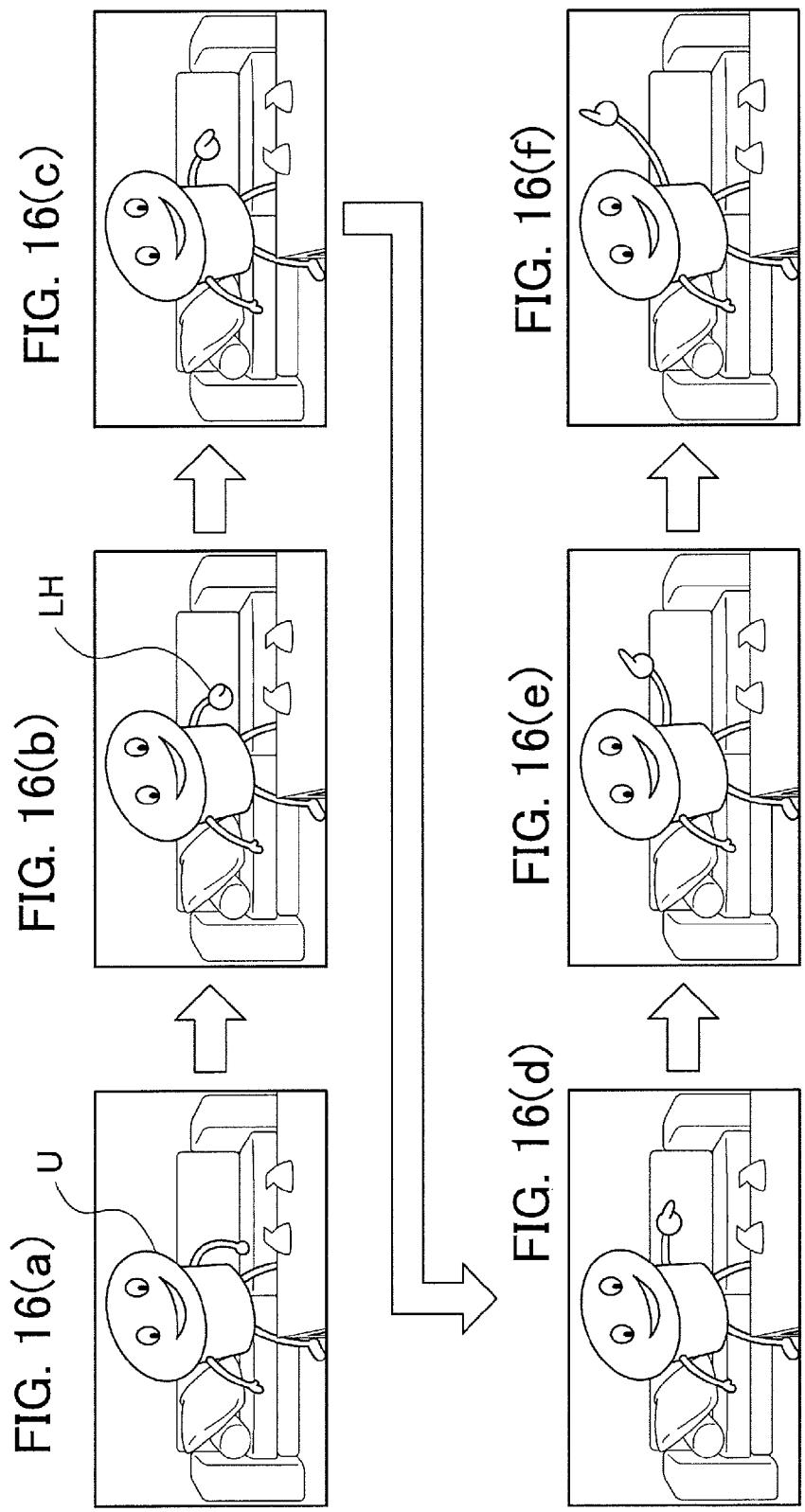
FIGS. 16(a) to 16(f) are diagrams showing still another example of the pre-gesture motion (which forms the left hand in a shape with one finger extended) immediately before the gesture detected by the gesture recognition device according to the first embodiment.

FIGS. 15(a) to 15(f) are diagrams showing a gesture (motion of opening the palm of the left hand) and a pre-gesture motion PG (motion of gradually opening the palm while moving the left hand) immediately before the gesture that is detected by the gesture recognition device 1 according to the first embodiment. FIGS. 16(a) to 16(f) are diagrams showing a gesture (motion of extending one finger of the left hand) and a pre-gesture motion PG (motion of gradually extending the finger while moving the left hand) immediately before the gesture that is detected by the gesture recognition device 1 according to the first embodiment. The gesture to which the present invention is applicable can be the motion of opening the palm of a hand as shown in FIGS. 15(e) and 15(f). The gesture to which the present invention is applicable can also be the motion of extending one finger to point at something as shown in FIGS. 16(e) and 16(f). In these cases, the gesture recognition device 1 is capable of recognizing the motions, as shown in FIGS. 15(a) to 15(d) and FIGS. 16(a) to 16(d), of gradually changing the shape of the hand when the hand is raised, as the pre-gesture motion PG.

In the first embodiment, the pre-gesture motion prediction unit 22 predicts whether or not the user U has performed the pre-gesture motion PG, and when the user U has performed the pre-gesture motion PG, transmits the pre-gesture motion prediction result PGR indicating the fact to the pre-gesture motion prediction result storage unit 23. The pre-gesture motion prediction result storage unit 23 stores the pre-gesture motion prediction result PGR.

Incidentally, the pre-gesture motion prediction unit 22 may be configured to store the degree-of-similarity calculation result itself in the pre-gesture motion prediction result storage unit 23 as pre-gesture motion predictive probability PGPR, instead of storing the pre-gesture motion prediction result PGR in the pre-gesture motion prediction result storage unit 23 only when the user U has performed the pre-gesture motion PG.

The gesture recognition unit 31 may read out the pre-gesture motion prediction result PGR represented as the probability as mentioned above from the pre-gesture motion prediction result storage unit 23 and change (e.g., shorten) the time necessary for the recognition by changing the number of frames to be compared according to the probability in the calculation of the degree of similarity between the body part motion information 150 and the gesture model information GM. In other words, the gesture recognition unit 31 may change the time of the captured image data used for the second comparison among the multiple frames of captured image data (i.e., change the amount of the captured image data as the targets of comparison in the second comparison and thereby change the time corresponding to the captured image data) in accordance with the first degree of similarity between the body part motion information 150 and the pre-gesture motion model information (pre-gesture motion prediction result PGR). For example, when the pre-gesture motion predictive probability PGPR is high, the probability that the gesture will be performed is high, and thus the gesture recognition unit 31 recognizes that the gesture has been performed at the point when a relatively small number of frames from the beginning of the actual gesture coincide with the gesture model information GM. In other words, the gesture recognition unit 31 may shorten the time of the captured image data used for the second comparison among the multiple frames of captured image data (i.e., reduce the amount of the captured image data as the targets of comparison in the second comparison and thereby shorten the time corresponding to the captured image data) when the first degree of similarity between the body part motion information 150 and the pre-gesture motion model information (pre-gesture motion prediction result PGR) is higher than or equal to a predetermined first threshold value. In contrast, when the pre-gesture motion predictive probability PGPR is low, the probability that the gesture will be performed is considered to be low and the gesture is recognized to have been performed at the point when a relatively large number of frames from the beginning of the actual gesture coincide with the gesture model information GM. With such a configuration, even in cases where the right swipe is performed after raising the left hand LH in a manner slightly different from that in the pre-gesture motion model information PGM, for example, the recognition of the gesture becomes possible.

While the right swipe has been described in the first embodiment as a gesture recognized by the gesture recognition device 1, a plurality of gestures including other gestures can be used as the objects of the recognition at the same time. In this case, the pre-gesture motion model information PGM regarding part or all of the gestures as the recognition objects is previously stored in the pre-gesture motion model storage unit 21. The pre-gesture motion prediction unit 22 is configured to be capable of predicting the pre-gesture motions PG of the gestures, and the gesture model storage unit 32 previously stores the gesture model information GM regarding the gestures. The gesture recognition unit 31 is configured to recognize these gestures and transmits a control signal, for executing the equipment control corresponding to the recognized gesture, to the equipment control unit 41. With such a process, multiple types of gestures can be inputted by the user U and various types of equipment control can be executed.

The pre-gesture motion prediction unit 22 may be configured to store the degree-of-similarity calculation result itself regarding each gesture in the pre-gesture motion prediction result storage unit 23 as the pre-gesture motion predictive probability PGPR, instead of storing the pre-gesture motion prediction result PGR in the pre-gesture motion prediction result storage unit 23 only when the user U has performed the pre-gesture motion PG.

When the gesture recognition unit 31 reads out such pre-gesture-motion prediction result PGR represented as the probability from the pre-gesture motion prediction result storage unit 23 and calculates the degree of similarity between the body part motion information 150 and the gesture model information GM, the gesture recognition unit 31 may shorten the time necessary for the recognition by changing the number of frames to be compared gesture by gesture according to the probability, for example. With such a configuration, the gesture recognition unit 31 is enabled to recognize the gesture even when multiple types of gestures are the recognition objects and the actual gesture is performed after performing a motion different from the pre-gesture motion model information PGM.

While a case where the gesture recognized by the gesture recognition device 1 is the right swipe has been described in the first embodiment, the gesture recognition device 1 can handle a plurality of gestures including other gestures as the recognition objects at the same time. In this case, it is possible to carry out the prediction of the pre-gesture motion PG and the gesture recognition in consideration of usage status such as the equipment, the outside world, the time of day and the frequency of use of each gesture in the past. Here, the equipment means the control object equipment connected to the gesture recognition device 1. The outside world means the installation environment of the gesture recognition device 1 or the equipment. The time information may be acquired either from the outside or from a built-in clock. As above, the gesture recognition device 1 is capable of narrowing down the gestures to be recognized on the basis of the status of the equipment. Further, the gesture recognition device 1 can previously collect and store time slot information and usage frequency information, such as information indicating that a certain gesture is performed frequently in a particular time slot in a day, and thereby narrow the range of the gestures before the gesture identification process. With such a configuration, the probability of successful prediction of the pre-gesture motion PG and the recognition success rate of the gesture recognition can be increased.

While the description in the first embodiment has been given of a case where the left hand LH is the body part as the object of the recognition, other body parts can also be used as the objects. For example, body parts such as the tip of an index finger, an elbow, a knee and a shoulder can also be used as the recognition objects. In different types of gestures, a body part generally makes different motions. The recognition success rate can be improved by using a body part that makes a characteristic motion as the recognition object for each gesture.

While the description in the first embodiment has been given of a case where the left hand LH is the body part as the recognition object, the number of the body parts as the recognition objects may be other than one and it is possible to use two or more body parts. By performing the gesture recognition by use of a combination of motions of the multiple body parts, the recognition can be possible with an improved recognition rate even for gestures that are hard to recognize based on the motion of one part.

Since the gesture can be recognized by use of the combination of the pre-gesture motion and the actual gesture motion in the first embodiment, even when the gesture motion by the user U is performed at high speed, the amount of usable captured image data increases compared to cases where only the gesture motion is used for the gesture recognition. Accordingly, the first embodiment also has the effect of improving the gesture recognition success rate.

Second Embodiment

Figure 17:
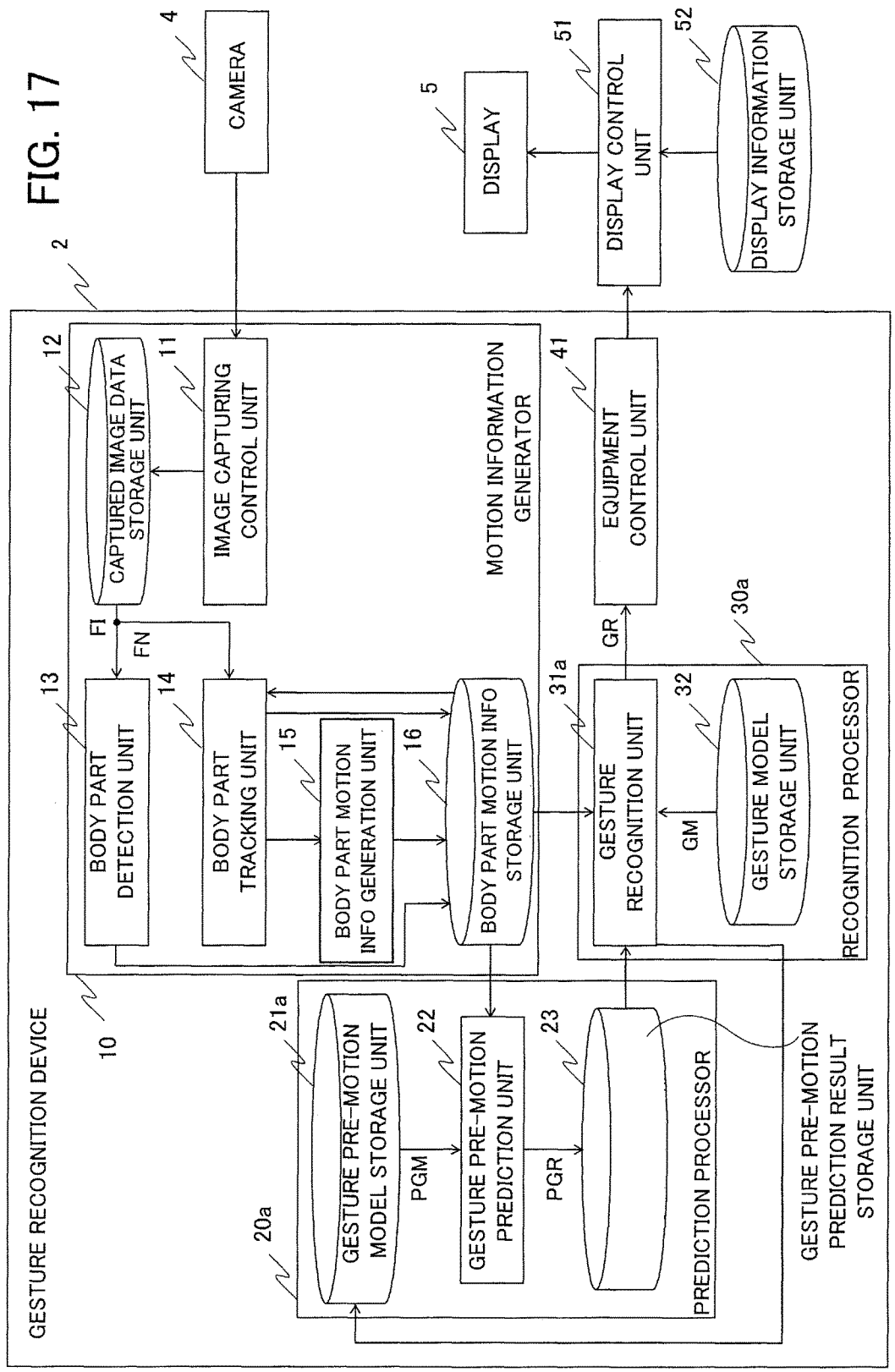
FIG. 17 is a block diagram schematically showing a configuration of a gesture recognition device according to a second embodiment of the present invention.

FIG. 17 is a block diagram schematically showing a configuration of a gesture recognition device 2 according to a second embodiment of the present invention. The gesture recognition device 2 is a device capable of executing a gesture recognition method according to the second embodiment. In FIG. 17, components that are the same as or correspond to those shown in FIG. 3 are assigned the same reference characters as those in FIG. 3. In the second embodiment, a description will be given of a case where the camera and the display shown in FIG. 1 are connected to the gesture recognition device 2. The gesture recognition device 2 (FIG. 17) according to the second embodiment differs from the gesture recognition device 1 (FIG. 3) according to the first embodiment in that data is sent from a gesture recognition unit 31a to a pre-gesture motion model storage unit 21a. Except for this feature, the second embodiment is the same as the first embodiment. The gesture recognition device 2 according to the second embodiment successively updates the pre-gesture motion model information PGM stored in the pre-gesture motion model storage unit 21, and thus the probability of successful prediction of the user U's pre-gesture motion PG can be increased.

The gesture recognition unit 31a sends the body part motion information 150 to the pre-gesture motion model storage unit 21a. The pre-gesture motion model storage unit 21a receives the body part motion information 150 from the gesture recognition unit 31a and stores the body part motion information 150.

The gesture recognition unit 31a in the gesture identification phase S4 identifies the gesture by calculating the degree of similarity between the body part motion information 150 regarding all of the frames with the gesture model information GM regarding all of the frames. Alternatively, the gesture recognition unit 31a in the gesture identification phase S4 identifies the gesture by calculating the degree of similarity between the body part motion information 150 regarding part of the frames with the gesture model information GM regarding part of the frames. The gesture recognition unit 31a transmits the gesture identification result GR to the equipment control unit 41 when the user U is recognized to be in the middle of performing (or to have performed) the gesture, or performs no processing when the user U is recognized to be not performing the gesture.

In the case where the user U is recognized to be in the middle of performing (or to have performed) the gesture, the gesture recognition unit 31a extracts information before the information regarding the gesture from the body part motion information 150. In other words, the gesture recognition unit 31a extracts the pre-gesture motion PG in the currently identified gesture. The gesture recognition unit 31a transmits the body part motion information 150 regarding the pre-gesture motion PG to the pre-gesture motion model storage unit 21a.

The pre-gesture motion model storage unit 21a stores the body part motion information 150 received from the gesture recognition unit 31a as the pre-gesture motion model information PGM. At this time, if the pre-gesture motion model storage unit 21 has already stored pre-gesture motion model information PGM, it newly stores the average of those or newly stores the pre-gesture motion model information PGM read out from the gesture recognition unit 31a.

As described above, in the gesture recognition device 2 according to the second embodiment, the gesture performed by the user U can be recognized before the time point when the gesture is completed, and thus the equipment control based on the gesture recognition result can be carried out more quickly compared to the conventional technology. Accordingly, a time lag from the gesture execution to the equipment control felt by the user U can be shortened and gesture operation stressless for the user U becomes possible.

Further, since the pre-gesture motion model information PGM can be successively updated in the gesture recognition device 2 according to the second embodiment, changes in the way of performing the gesture due to the user U's habit or habituation can be incorporated successively, by which the probability of successful prediction of the pre-gesture motion PG can be increased.

Third Embodiment

Figure 18:
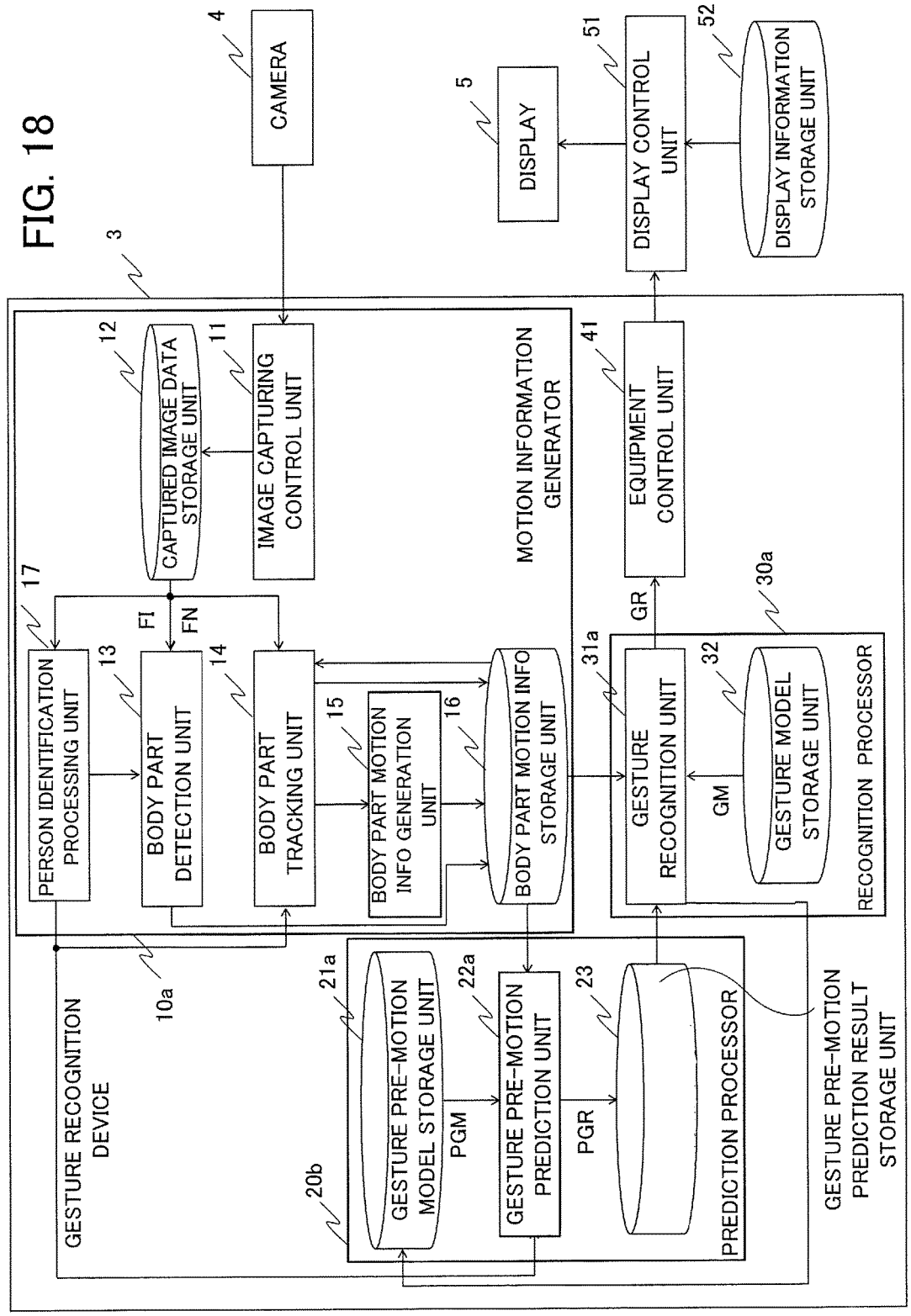
FIG. 18 is a block diagram schematically showing a configuration of a gesture recognition device according to a third embodiment of the present invention.

FIG. 18 is a block diagram schematically showing a configuration of a gesture recognition device 3 according to a third embodiment of the present invention. The gesture recognition device 3 is a device capable of executing a gesture recognition method according to the third embodiment. In FIG. 18, components that are the same as or correspond to those shown in FIG. 17 are assigned the same reference characters as those in FIG. 17. In the third embodiment, a description will be given of a case where the camera and the display shown in FIG. 1 are connected to the gesture recognition device 3. The gesture recognition device 3 (FIG. 18) according to the third embodiment differs from the gesture recognition device 2 (FIG. 17) according to the second embodiment in that a person identification processing unit 17 that identifies a person performing a gesture is provided. Except for this feature, the third embodiment is the same as the second embodiment. The gesture recognition device 3 according to the third embodiment performs the gesture recognition in consideration of user information. With the gesture recognition device 3 according to the third embodiment, the probability of successful prediction of the user U's pre-gesture motion PG can be increased.

In FIG. 18, the person identification processing unit 17 of a motion information generator 10a acquires a frame image FI from the captured image data storage unit 12 and transmits a person identification result HDR regarding a person included in the frame image FI to the body part detection unit 13, the body part tracking unit 14 and a pre-gesture motion prediction unit 22a.

The body part detection unit 13 acquires the frame image FI and its frame number FN from the captured image data storage unit 12 and transmits the left hand coordinates LHP included in the frame image FI and the frame number FN to the body part motion information storage unit 16. The body part detection unit 13 also receives the person identification result HDR from the person identification processing unit 17 and transmits a set of the left hand coordinates LHP and the frame number FN to the body part motion information storage unit 16.

The body part tracking unit 14 acquires the frame image FI and its frame number FN from the captured image data storage unit 12. The body part tracking unit 14 also acquires the left hand coordinates LHP of a particular user in the frame image FI of one frame before from the body part motion information storage unit 16. The body part tracking unit 14 also acquires the person identification result HDR from the person identification processing unit 17. The body part tracking unit 14 transmits the left hand coordinates LHP in the frame image FI of one frame before, the left hand coordinates LHP in the current frame image FI, and the person identification result HDR to the body part motion information generation unit 15. The body part tracking unit 14 also transmits a control signal for deleting the stored body part motion information 150 to the body part motion information storage unit 16.

The body part motion information generation unit 15 receives the left hand coordinates LHP(−1) in the frame image FI(−1) of one frame before, the left hand coordinates LHP(0) in the current frame image FI(0), and the person identification result HDR from the body part tracking unit 14, and transmits the body part motion information 150 to the body part motion information storage unit 16.

The pre-gesture motion model storage unit 21a stores the pre-gesture motion model information PGM regarding each user. The pre-gesture motion model storage unit 21a transmits the pre-gesture motion model information PGM regarding a particular user to the pre-gesture motion prediction unit 22a.

The pre-gesture motion prediction unit 22a reads out the body part motion information 150 regarding a particular user (user having a body part motion in the newest frame image FI) from the body part motion information storage unit 16. The pre-gesture motion prediction unit 22a receives the pre-gesture motion model information PGM regarding the user from the pre-gesture motion model storage unit 21a. The pre-gesture motion prediction unit 22a transmits the pre-gesture motion prediction result PGR regarding the user to the pre-gesture motion prediction result storage unit 23.

The pre-gesture motion prediction result storage unit 23 receives the pre-gesture motion prediction result PGR regarding the particular user from the pre-gesture motion prediction unit 22a and stores the pre-gesture motion prediction result PGR. The pre-gesture motion prediction result storage unit 23 transmits the pre-gesture motion prediction result PGR regarding the particular user to the gesture recognition unit 31a.

The gesture recognition unit 31a receives the body part motion information 150 regarding the particular user from the body part motion information storage unit 16. The gesture recognition unit 31a also receives the pre-gesture motion prediction result PGR regarding the particular user from the pre-gesture motion prediction result storage unit 23. The gesture recognition unit 31a also reads out the gesture model information GM regarding the particular user from the gesture model storage unit 32. The gesture recognition unit 31a transmits the gesture identification result GR to the equipment control unit 41.

The gesture model storage unit 32 stores the gesture model information GM regarding each user. The gesture recognition unit 31a acquires the gesture model information GM regarding a particular user from the gesture model storage unit 32.

First, the person identification processing unit 17 receives a frame image FI from the captured image data storage unit 12 and performs the person identification process regarding a user included in the frame image FI. Face detection or the like can be taken as an example of the method of the person identification process. After performing the person identification process, the person identification processing unit 17 transmits the person identification result HDR to the body part detection unit 13, the body part tracking unit 14 and the pre-gesture motion prediction unit 22a.

The body part detection unit 13 detects a body part and transmits detection result information to the body part motion information storage unit 16. At this time, the body part detection unit 13 transmits the person identification result HDR received from the person identification processing unit 17 to the body part motion information storage unit 16.

The body part tracking unit 14 performs the tracking of the body part in multiple frame images FI read out from the captured image data storage unit 12. At this time, the body part tracking unit 14 tracks the body part of the same person on the basis of the person identification result HDR received from the person identification processing unit 17. For example, the body part tracking unit 14 performs the tracking of a hand of a first user and a hand of a second user as different body parts by using the person identification result HDR.

When the tracking is successful, the body part tracking unit 14 transmits the left hand coordinates LHP(−1) in the frame image FI(−1) of one frame before, the left hand coordinates LHP(0) in the current frame image FI(0), and the person identification result HDR to the body part motion information generation unit 15.

The body part motion information generation unit 15 receives the left hand coordinates LHP(−1) in the frame image FI(−1) of one frame before, the left hand coordinates LHP(0) in the current frame image FI(0), and the person identification result HDR from the body part tracking unit 14 and generates the body part motion information 150 from these items of information. At this time, the body part motion information 150 regarding a user is described in a file specifically for the user. It is also possible to describe the body part motion information 150 in the same file. In this case, the body part motion information 150 is described so that body part motion information regarding different users can be discriminated from each other. The body part motion information storage unit 16 stores the body part motion information 150.

The pre-gesture motion model storage unit 21a stores the pre-gesture motion model information PGM regarding each user. Since the pre-gesture motion model information PGM is stored in regard to each user, body motions specific to each user such as each user's habit can be incorporated. The pre-gesture motion model information PGM may be either information acquired and registered based on a gesture previously performed by the user or information successively stored and updated by feeding back the result of recognition from the gesture recognition unit 31a as in the second embodiment. The pre-gesture motion prediction unit 22a acquires the pre-gesture motion model information PGM regarding a particular user from the pre-gesture motion model storage unit 21a.

The pre-gesture motion prediction unit 22a acquires the body part motion information 150 regarding a particular user (user having a body part motion in the newest frame image FI) from the body part motion information storage unit 16. The pre-gesture motion prediction unit 22a also acquires the pre-gesture motion model information PGM regarding the user from the pre-gesture motion model storage unit 21a and calculates the degree of similarity. The pre-gesture motion prediction unit 22a compares the calculated degree of similarity with the threshold value MTH1, predicts whether or not the user has performed the pre-gesture motion PG, and transmits the pre-gesture motion prediction result PGR. The pre-gesture motion prediction result storage unit 23 stores the pre-gesture motion prediction result PGR.

The gesture recognition unit 31a acquires the body part motion information 150 regarding the particular user from the body part motion information storage unit 16 and also reads out the aforementioned gesture model information from the gesture model storage unit 32. Further, in cases where the pre-gesture motion prediction result PGR regarding the user is stored in the pre-gesture motion prediction result storage unit 23, the gesture recognition unit 31a receives the pre-gesture motion prediction result PGR. The gesture recognition unit 31a performs no processing in cases where the pre-gesture motion prediction result PGR regarding the user is not stored in the pre-gesture motion prediction result storage unit 23. Thereafter, the gesture recognition unit 31a calculates the degree of similarity between the acquired body part motion information 150 and gesture model information GM and identifies the gesture on the basis of the degree of similarity.

Incidentally, the gesture model storage unit 32 stores the gesture model information GM in regard to each user. The gesture recognition unit 31a transmits the gesture model information GM regarding the particular user.

In the gesture recognition device 3 configured as above, the gesture performed by the user U can be recognized before the time point when the gesture is completed, and thus the equipment control based on the gesture recognition result can be carried out more quickly compared to the conventional technology. Accordingly, the time lag from the gesture execution to the equipment control felt by the user U can be shortened and gesture operation stressless for the user U becomes possible.

Further, the gesture recognition device 3 recognizes the pre-gesture motion PG and the gesture in regard to each user. Accordingly, difference in the way of performing the gesture due to the user U's habit or the like can be absorbed, by which the probability of successful prediction of the pre-gesture motion PG and the recognition success rate of the gesture can be increased.

In the third embodiment, not only the face detection but also other methods are usable as the contents of the person identification process. For example, a hairstyle, clothing, height, etc. of the user as a person may be used as information enabling the user identification.

In the third embodiment, the gestures to be recognized can be narrowed down depending on the user. With such a configuration, the probability of successful prediction of the pre-gesture motion PG and the recognition success rate of the gesture recognition can be increased.

Modification Examples

Figure 19:
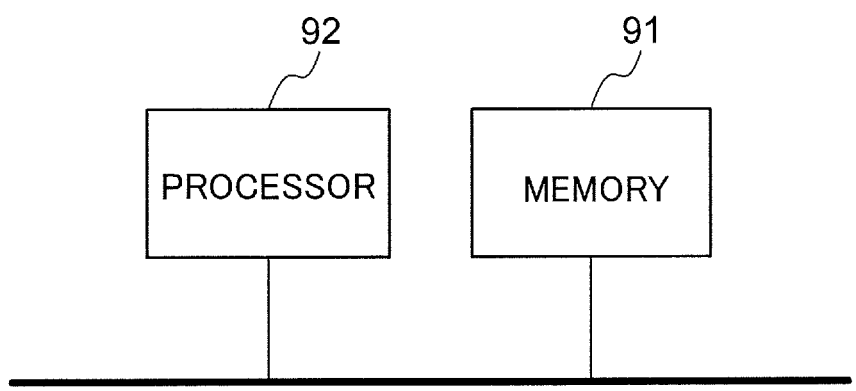
FIG. 19 is a hardware configuration diagram showing a modification example of the gesture recognition devices according to the first to third embodiments of the present invention.

FIG. 19 is a hardware configuration diagram showing a modification example of the gesture recognition devices according to the first to third embodiments of the present invention. The gesture recognition device 1 shown in FIG. 3 can be implemented by use of a memory 91 as a storage device for storing a program as software and a processor 92 as an information processing unit for executing the program stored in the memory 91 (e.g., by a computer). In this case, the captured image data storage unit 12, the body part motion information storage unit 16, the pre-gesture motion model storage unit 21, the pre-gesture motion prediction result storage unit 23 and the gesture model storage unit 32 in FIG. 3 correspond to the memory 91 in FIG. 19. Meanwhile, the image capturing control unit 11, the body part detection unit 13, the body part tracking unit 14, the body part motion information generation unit 15, the pre-gesture motion prediction unit 22, the gesture recognition unit 31 and equipment control unit 41 in FIG. 3 correspond to the processor 92 for executing the program. It is also possible to implement part of the gesture recognition device 1 shown in FIG. 3 by the memory 91 and the processor 92 for executing the program shown in FIG. 19.

The gesture recognition device 2 shown in FIG. 17 can be implemented by use of the memory 91 as a storage device for storing a program as software and the processor 92 as an information processing unit for executing the program stored in the memory 91 (e.g., by a computer). In this case, the captured image data storage unit 12, the body part motion information storage unit 16, the pre-gesture motion model storage unit 21a, the pre-gesture motion prediction result storage unit 23 and the gesture model storage unit 32 in FIG. 17 correspond to the memory 91 in FIG. 19. Meanwhile, the image capturing control unit 11, the body part detection unit 13, the body part tracking unit 14, the body part motion information generation unit 15, the pre-gesture motion prediction unit 22, the gesture recognition unit 31a and equipment control unit 41 in FIG. 17 correspond to the processor 92 for executing the program. It is also possible to implement part of the gesture recognition device 2 shown in FIG. 17 by the memory 91 and the processor 92 for executing the program shown in FIG. 19.

The gesture recognition device 3 shown in FIG. 18 can be implemented by use of the memory 91 as a storage device for storing a program as software and the processor 92 as an information processing unit for executing the program stored in the memory 91 (e.g., by a computer). In this case, the captured image data storage unit 12, the body part motion information storage unit 16, the pre-gesture motion model storage unit 21a, the pre-gesture motion prediction result storage unit 23 and the gesture model storage unit 32 in FIG. 18 correspond to the memory 91 in FIG. 19. Meanwhile, the image capturing control unit 11, the body part detection unit 13, the body part tracking unit 14, the body part motion information generation unit 15, the person identification processing unit 17, the pre-gesture motion prediction unit 22a, the gesture recognition unit 31a and equipment control unit 41 in FIG. 18 correspond to the processor 92 for executing the program. It is also possible to implement part of the gesture recognition device 3 shown in FIG. 18 by the memory 91 and the processor 92 for executing the program shown in FIG. 19.

INDUSTRIAL APPLICABILITY

The gesture recognition device, the gesture recognition method and the information processing device according to the present invention are applicable to a variety of electronic devices such as broadcast receivers, PCs, car navigation systems and information communication terminals, for example.

Further, the gesture recognition device, the gesture recognition method and the information processing device according to the present invention are applicable to broadcast receivers that change the viewed/listened channel according to a gesture performed by the user and broadcast receivers that change the display status of the electronic program guide displayed on a display according to a gesture performed by the user.

DESCRIPTION OF REFERENCE CHARACTERS

1, 2, 3, 7: gesture recognition device, 4: camera, 5: display, 10, 10a: motion information generator, 11: image capturing control unit, 12: captured image data storage unit, 13: body part detection unit, 14: body part tracking unit, 15: body part motion information generation unit, 16: body part motion information storage unit, 17: person identification processing unit, 20, 20a, 20b: prediction processor, 21, 21a: pre-gesture motion model storage unit (first storage unit), 22, 22a: pre-gesture motion prediction unit, 23: pre-gesture motion prediction result storage unit, 30, 30a: recognition processor, 31, 31a: gesture recognition unit, 32: gesture model storage unit (second storage unit), 41: equipment control unit, 51: display control unit, 52: display information storage unit.

What is claimed is:

1. A gesture recognition device comprising:
a motion information generator that generates body part motion information from a motion of a body part obtained by performing detection and tracking of the body part of a user in each of multiple frames of captured image data acquired by capturing images of the user;
a prediction processor that previously stores pre-gesture motion model information indicating a reference motion of the body part of the user regarding a pre-gesture motion performed immediately before a gesture, makes a first comparison of comparing the body part motion information generated by the motion information generator with the pre-gesture motion model information, and generates a prediction result regarding the pre-gesture motion represented by the motion of the body part detected by the motion information generator on a basis of a result of the first comparison; and
a recognition processor that previously stores gesture model information indicating a reference motion of the body part of the user in the gesture, makes a second comparison of comparing the body part motion information generated by the motion information generator with the gesture model information, and generates a result of recognition of the gesture represented by the motion of the body part detected by the motion information generator on a basis of the prediction result and a result of the second comparison, wherein:
the recognition processor transmits the body part motion information immediately before the recognized gesture to the prediction processor, and
the prediction processor stores the body part motion information immediately before the recognized gesture as the pre-gesture motion model information.

2. The gesture recognition device according to claim 1, wherein the recognition processor changes a time of captured image data used for the second comparison in the multiple frames of captured image data in accordance with first degree of similarity between the body part motion information and the pre-gesture motion model information.

3. The gesture recognition device according to claim 1, wherein the recognition processor shortens a time of captured image data used for the second comparison in the multiple frames of captured image data when first degree of similarity between the body part motion information and the pre-gesture motion model information is higher than or equal to a predetermined first threshold value.

4. The gesture recognition device according to claim 1, wherein the recognition processor narrows down a range of the gesture model information used for the second comparison in accordance with first degree of similarity between the body part motion information and the pre-gesture motion model information.

5. The gesture recognition device according to claim 1, wherein the recognition processor narrows down a range of the gesture model information used for the second comparison when first degree of similarity between the body part motion information and the pre-gesture motion model information is higher than or equal to a predetermined first threshold value.

6. The gesture recognition device according to claim 1, wherein the prediction processor narrows down the pre-gesture motion model information used for the first comparison in accordance with at least one of a type of control object equipment connected to the gesture recognition device, installation environment of the gesture recognition device, a time of day, and frequency of use of each gesture per time slot.

7. The gesture recognition device according to claim 1, wherein the recognition processor narrows down the gesture model information used for the second comparison in accordance with at least one of a type of control object equipment connected to the gesture recognition device, installation environment of the gesture recognition device, a time of day, and frequency of use of each gesture per time slot.

8. An information processing device comprising:
the gesture recognition device according to claim 1;
an image capturing device that transmits the captured image data to the gesture recognition device; and
control object equipment that is controlled in accordance with the result of recognition of the gesture.

9. A gesture recognition method executed by a gesture recognition device previously storing pre-gesture motion model information indicating a reference motion of a body part of a user regarding a pre-gesture motion performed immediately before a gesture and gesture model information indicating a reference motion of the body part of the user in the gesture, the method comprising:
a motion information generation step of generating body part motion information from a motion of the body part obtained by performing detection and tracking of the body part of the user in each of multiple frames of captured image data acquired by capturing images of the user;
a prediction processing step of making a first comparison of comparing the body part motion information generated in the motion information generation step with the pre-gesture motion model information and generating a prediction result regarding the pre-gesture motion represented by the motion of the body part detected in the motion information generation step on a basis of a result of the first comparison;
a recognition processing step of making a second comparison of comparing the body part motion information generated in the motion information generation step with the gesture model information and generating a result of recognition of the gesture represented by the motion of the body part detected in the motion information generation step on a basis of the prediction result and a result of the second comparison; and
a step of storing the body part motion information immediately before the gesture, the result of recognition of which has been generated in the recognition processing step, as the pre-gesture motion model information.

* * * * *